US010939614B2

(12) United States Patent
Bringhurst et al.

(10) Patent No.: US 10,939,614 B2
(45) Date of Patent: Mar. 9, 2021

(54) TRIMMER HEAD

(71) Applicant: MTD PRODUCTS INC, Valley City, OH (US)

(72) Inventors: Cory Bringhurst, Valley City, OH (US); Jeffrey Kucera, Medina, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 16/174,447

(22) Filed: Oct. 30, 2018

(65) Prior Publication Data

US 2019/0133033 A1 May 9, 2019

Related U.S. Application Data

(60) Provisional application No. 62/581,312, filed on Nov. 3, 2017.

(51) Int. Cl.
*A01D 34/416* (2006.01)
*A01D 101/00* (2006.01)

(52) U.S. Cl.
CPC ..... *A01D 34/4163* (2013.01); *A01D 34/4166* (2013.01); *A01D 2101/00* (2013.01)

(58) Field of Classification Search
CPC ............ A01D 34/4163; A01D 2101/00; A01D 34/4166
USPC .................................................. 30/276, 347
See application file for complete search history.

(56) References Cited

U.S. PATENT DOCUMENTS

| 2,557,598 | A | | 6/1951 | Daggett |
| 2,707,859 | A | | 5/1955 | Walker |
| 3,062,299 | A | | 11/1962 | Koepfinger |
| 3,208,209 | A | | 9/1965 | Dunlap |
| 4,195,408 | A | | 4/1980 | Palmieri |
| 5,023,998 | A | * | 6/1991 | Masciarella ....... A01D 34/4165 30/276 |
| 5,222,301 | A | | 6/1993 | Sugihara |
| 5,303,476 | A | | 4/1994 | Tuggle |
| 5,836,227 | A | | 11/1998 | Dees, Jr. |
| 5,979,064 | A | * | 11/1999 | Kitz ................... A01D 34/4165 30/276 |

(Continued)

FOREIGN PATENT DOCUMENTS

| AU | 2015202127 | 11/2015 |
| CN | 202697248 | 1/2013 |

(Continued)

OTHER PUBLICATIONS

International Search Report and Written Opinion for International Application No. PCT/US2018/058314 dated Feb. 12, 2019.

*Primary Examiner* — Hwei-Siu C Payer
(74) *Attorney, Agent, or Firm* — Wegman Hessler

(57) ABSTRACT

A trimmer head for use with a handheld lawn maintenance tool is shaped in a hub-and-spoke manner, wherein the trimmer head includes a housing formed of a hub, a circular rim, and a plurality of spokes extending therebetween. A spool is positioned within the hub, and a pair of pieces of trimmer line are inserted into opposing sides of the circular rim through the spokes for winding onto the spool. The trimmer line extends outwardly from the housing at a location spaced away from the hub.

17 Claims, 31 Drawing Sheets

(56) References Cited

U.S. PATENT DOCUMENTS

| | | | | |
|---|---|---|---|---|
| 6,035,618 A * | 3/2000 | Fogle | ............ | A01D 34/4166 30/276 |
| 6,112,416 A * | 9/2000 | Bridges | ............ | A01D 34/736 30/276 |
| 7,000,324 B2 | 2/2006 | Fogle | | |
| 7,913,401 B2 * | 3/2011 | Iacona | ............ | A01D 34/4168 30/275.4 |
| 8,745,879 B2 | 6/2014 | Alliss | | |
| 2002/0073556 A1 * | 6/2002 | Fogle | ............ | A01D 34/416 30/276 |
| 2004/0128840 A1 * | 7/2004 | Proulx | ............ | A01D 34/4166 30/276 |
| 2006/0026846 A1 * | 2/2006 | Alliss | ............ | A01D 34/416 30/276 |
| 2007/0084061 A1 * | 4/2007 | Bennett | ............ | A01D 34/416 30/276 |
| 2008/0155837 A1 * | 7/2008 | Moore | ............ | A01D 34/4166 30/276 |
| 2009/0031567 A1 * | 2/2009 | Fogle | ............ | A01D 34/416 30/276 |
| 2015/0245558 A1 * | 9/2015 | Morabit | ............ | A01D 34/4165 30/276 |
| 2015/0264862 A1 | 9/2015 | Skinner | | |
| 2015/0282425 A1 * | 10/2015 | Skinner | ............ | A01D 34/4166 30/276 |
| 2017/0006775 A1 | 1/2017 | Wyne | | |
| 2017/0349394 A1 * | 12/2017 | Alliss | ............ | A01D 34/4165 |
| 2019/0075721 A1 * | 3/2019 | Cholst | ............ | A01D 34/4165 |
| 2019/0133033 A1 * | 5/2019 | Bringhurst | ............ | A01D 34/4163 |

FOREIGN PATENT DOCUMENTS

| | | |
|---|---|---|
| CN | 204272679 | 4/2015 |
| CN | 2015124344 | 4/2016 |
| DE | 69906408 | 3/2004 |
| EP | 0603982 | 6/1994 |
| GB | 2450504 | 12/2008 |

\* cited by examiner

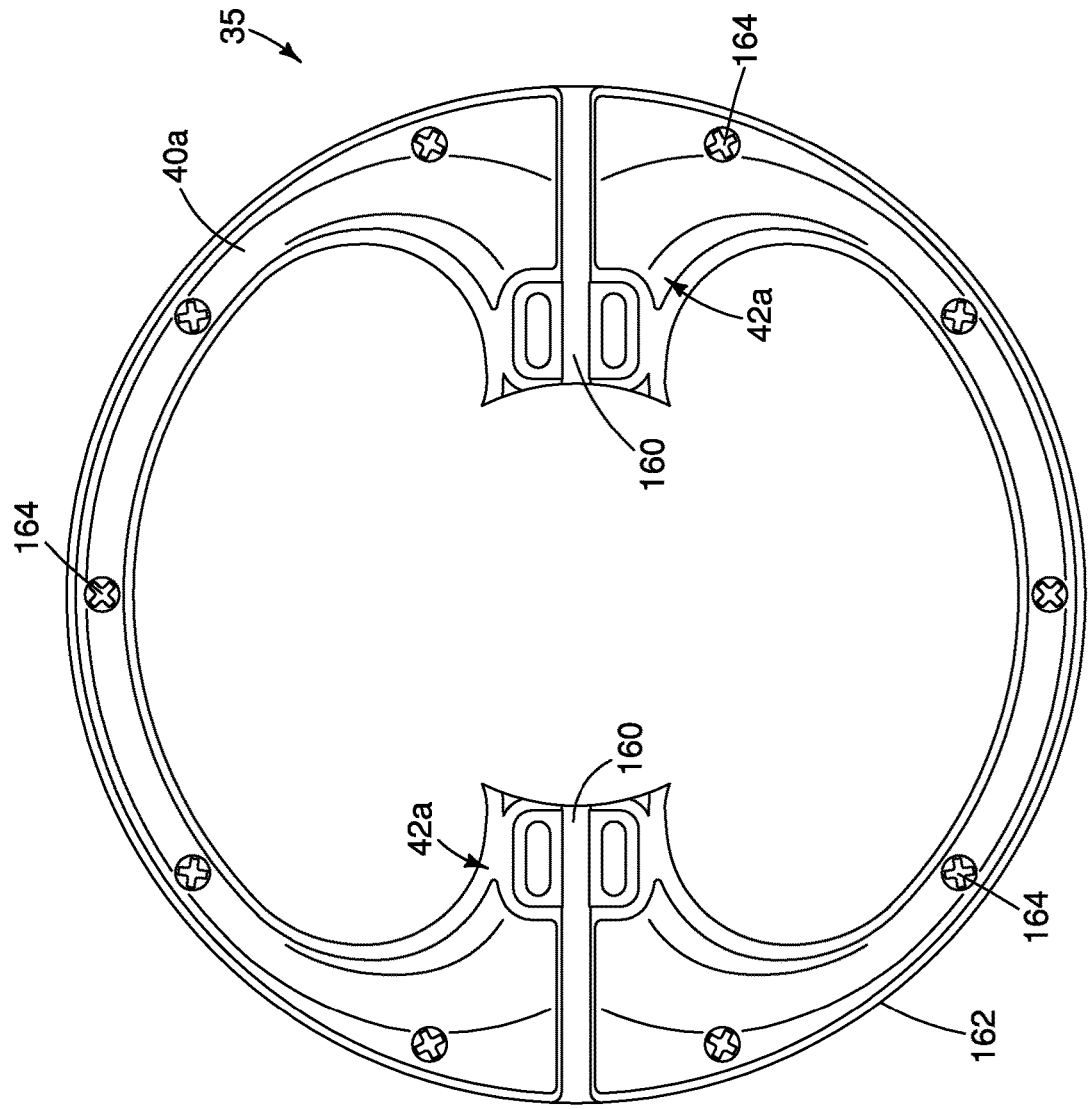

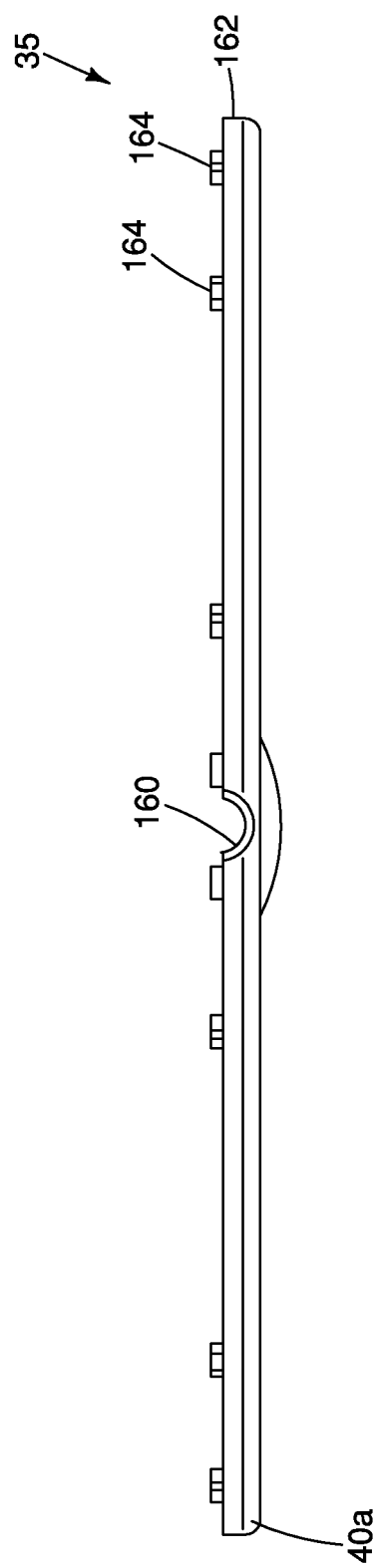

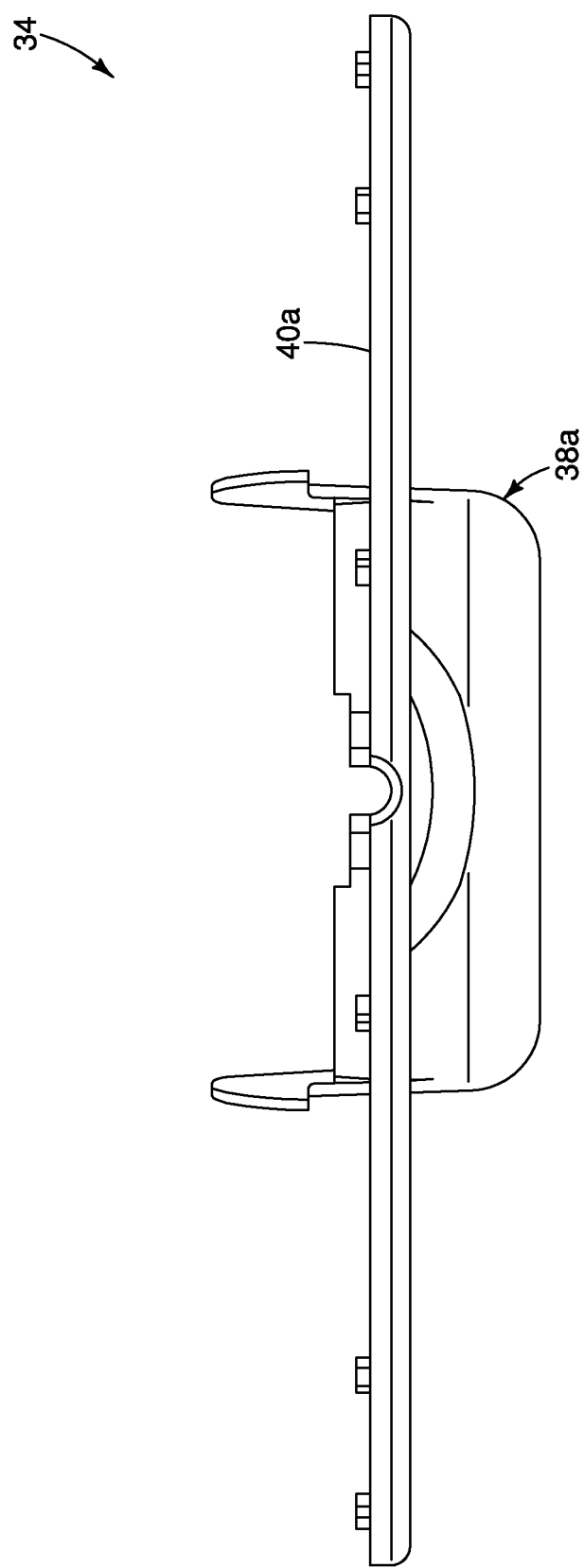

TRIMMER HEAD

FIELD OF THE INVENTION

The present invention is directed to a handheld lawn maintenance tool, and more particularly, to a trimmer head for a handheld vegetation cutting device.

BACKGROUND OF THE INVENTION

Handheld vegetation cutting devices, such as lawn maintenance tools, brush cutters, and the like are used to cut and trim grass, weeds, or other vegetation by rotating a trimmer head driven by a motor or internal combustion engine. The trimmer head includes a cutting member such as a trimmer line or cutting blade that extends from the trimmer head, wherein rotation of the trimmer head swings the cutting member such that the cutting member cuts the vegetation. Trimmer heads are typically formed as a fixed line-type trimmer head, a bump feed-type trimmer head, a cutting blade trimmer head, or a combination thereof.

In bump feed-type trimmer heads, a length of trimmer line is wound about a spool located within a housing. A portion of the trimmer line extends from the housing, and once the exposed length of trimmer line becomes worn to the point that it no longer effectively cuts the vegetation or the exposed trimmer line breaks, the operator bumps the trimmer head on the ground, sidewalk, or other substantially solid surface. This bump-feed operation causes the spool to unwind a pre-determined amount in order to feed another portion of the trimmer line out of the trimmer head in order to continue using the lawn maintenance tool.

One problem often associated with bump-feed type trimmer heads is that when the portion of one of the trimmer lines extending from the trimmer head breaks off at a location near the housing of the trimmer head (or within the housing of the trimmer head), the trimmer line is withdrawn into the trimmer head because the centrifugal forces generated during rotation of the trimmer head are not strong enough to maintain the trimmer line extending from the housing. As the trimmer line is withdrawn into the housing, the operator must stop the operation of the lawn maintenance tool, disassemble the trimmer head, and re-wind the trimmer line onto the spool and extend the end out of the trimmer head. This process can be very tedious because once the trimmer head housing is opened, both portions of trimmer line typically are unwound from the spool which often causes mixing of the trimmer lines or an unorganized ball of trimmer line.

Another problem associated with bump feed-type trimmer heads is that because the trimmer line has very little weight and the distal end of exposed trimmer line that extends from the housing is often located within a short distance of the axis of rotation of the trimmer head, the trimmer head is required to be rotated at a very high rotational velocity in order for the tip of the exposed trimmer line to have enough rotational velocity sufficient to cut through blades of grass, weeds, and other vegetation. Such a high rotational velocity of the trimmer head typically requires a significant amount of energy which tends to drain a battery (for a battery-operated lawn maintenance tool) or requires the engine to generate significant rotational output energy to rotate the trimmer head.

BRIEF SUMMARY OF THE INVENTION

A need therefore exists to provide a trimmer head for a handheld lawn maintenance tool in which the trimmer head reduces or eliminates the withdrawal of the exposed trimmer line back into the housing of the trimmer head when the trimmer line breaks at a location within the housing of the trimmer head or a location immediately outward from the housing. A need also exists to provide a trimmer head for a handheld lawn maintenance tool that can provide sufficient rotational velocity at the tip of the exposed trimmer line such that the rotational velocity of the trimmer head can be reduced while still providing an equivalent or better cut of grass, weeds, or vegetation.

In one aspect of the present invention, a trimmer head is provided. The trimmer head includes a housing having an upper disk body and a lower disk body. A spool is positioned within the housing. A spring located between the spool and the upper disk body biases the spool into selective engagement with the lower disk body. The housing includes a pair of opposing arms that extend radially outward to a circular rim.

In another aspect of the present invention, a trimmer head is provided. The trimmer head includes a housing having an upper disk body and a lower disk body, the upper disk body includes a core. A spool is positioned within the housing. A spring is located between the spool and the upper disk body for biasing the spool into selective engagement with the lower disk body. The housing includes a pair of opposing arms that extend radially outward to a circular rim. Each the pair of opposing arms comprises a pair of elongate channels extending radially outward to the circular rim.

In a further aspect of the present invention, a trimmer head is provided. The trimmer head includes a central hub, a circular rim spaced apart from the central hub, and a plurality of spokes extending between the central hub the said rim. At least one cutting member extends from the rim.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 9B is a top view of the lower disk member shown in FIG. 9A;

FIG. 9C is a side view of the lower disk member shown in FIG. 9A;

FIG. 10C is a side view of the lower disk body shown in FIG. 10A;

Figure 1:
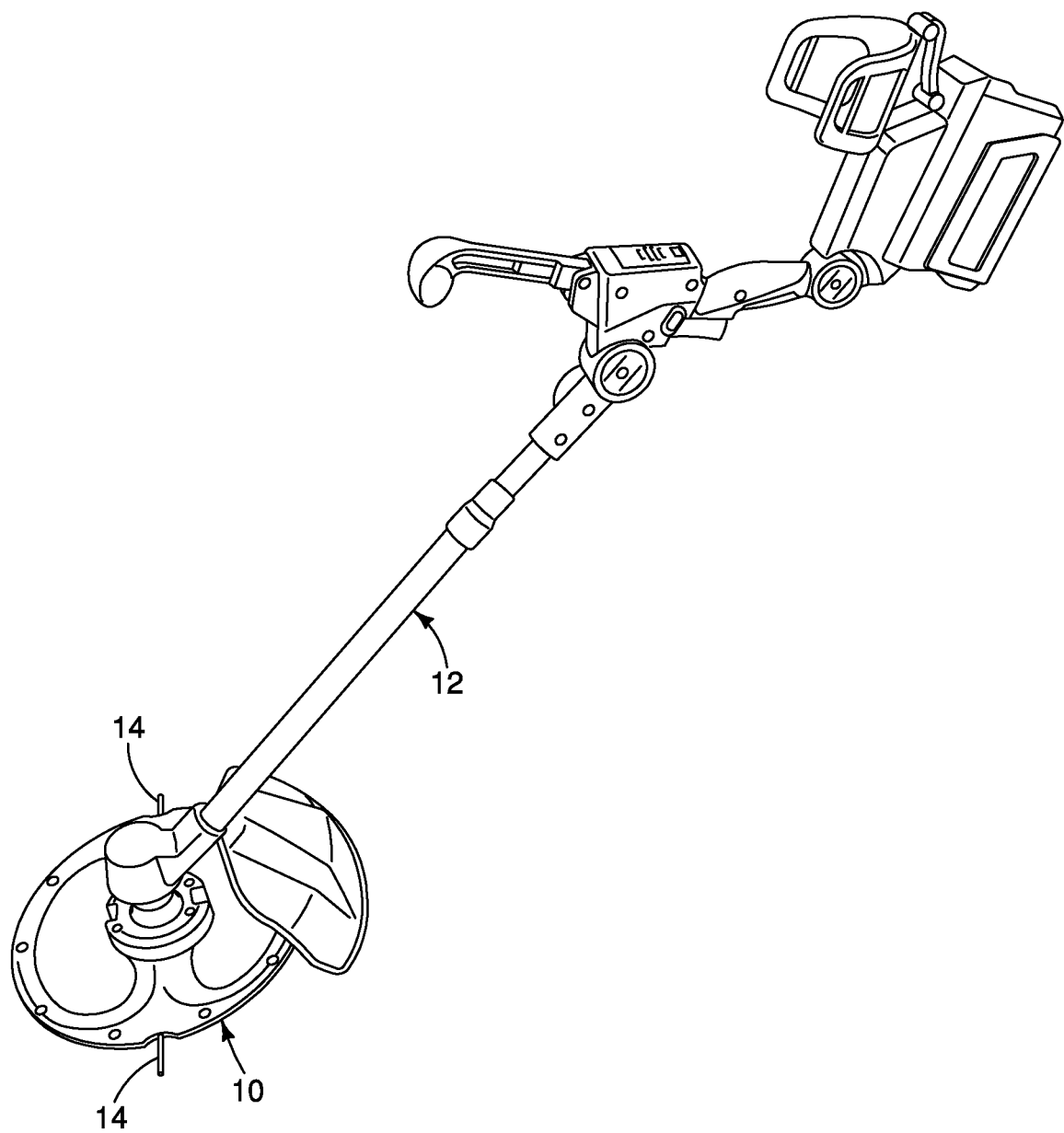
FIG. 1 is an embodiment of a handheld lawn maintenance tool and a hub-and-spoke trimmer head.
Figure 2:
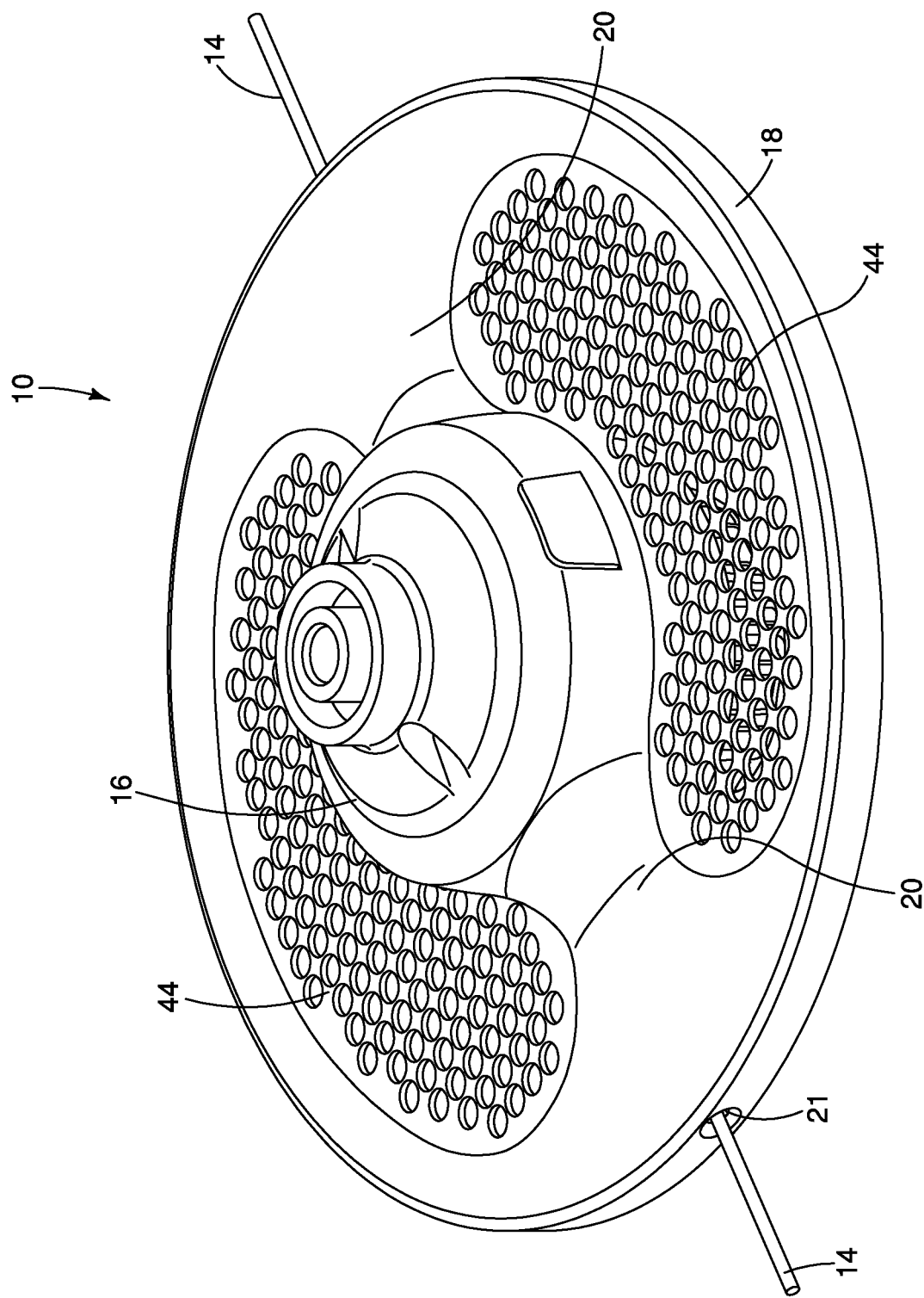
FIG. 2 is an upper isometric view of a hub-and-spoke trimmer head.
Figure 3:
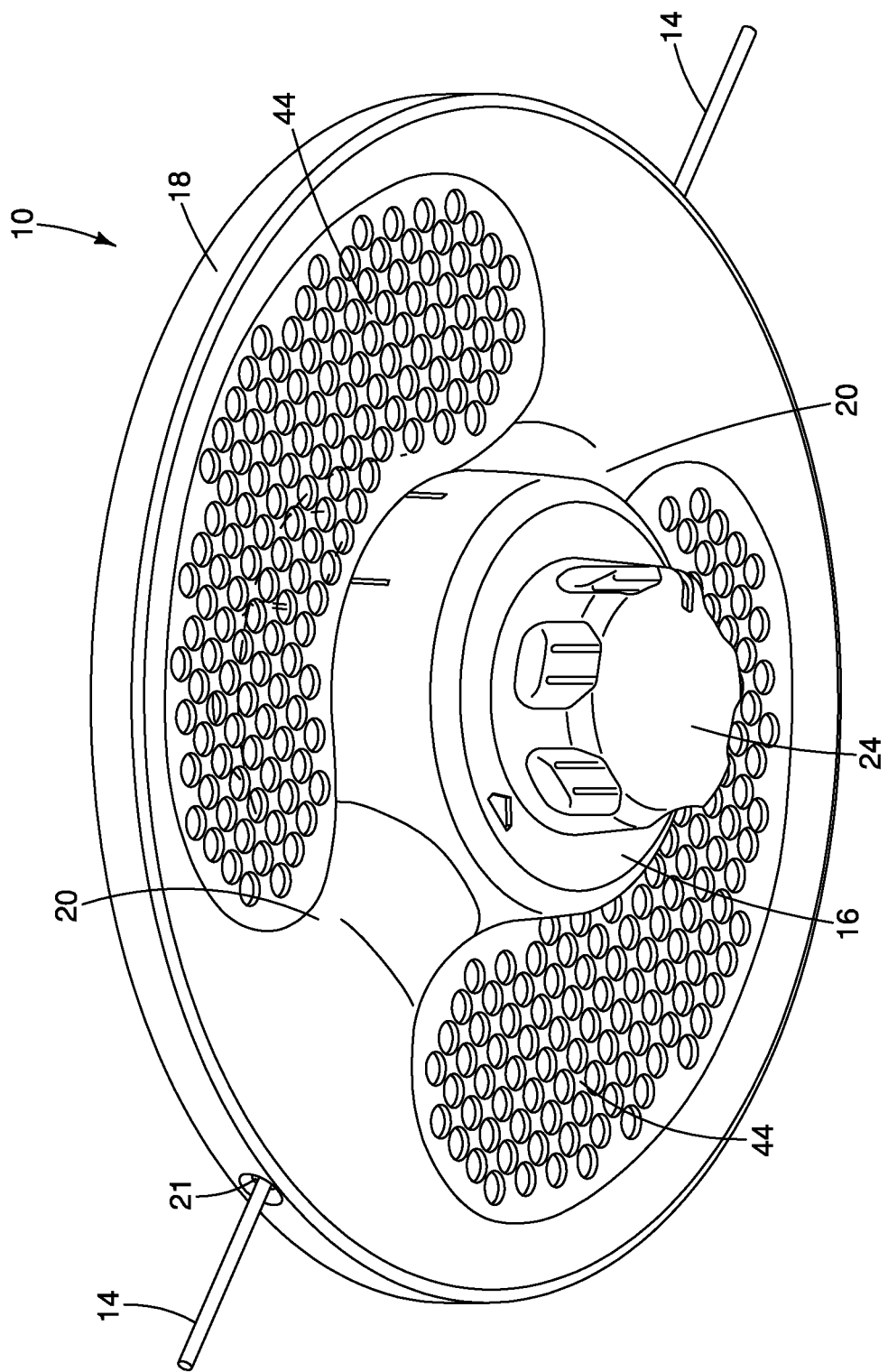
FIG. 3 is a lower isometric view of the hub-and-spoke trimmer head shown in FIG. 2.
Figure 4:
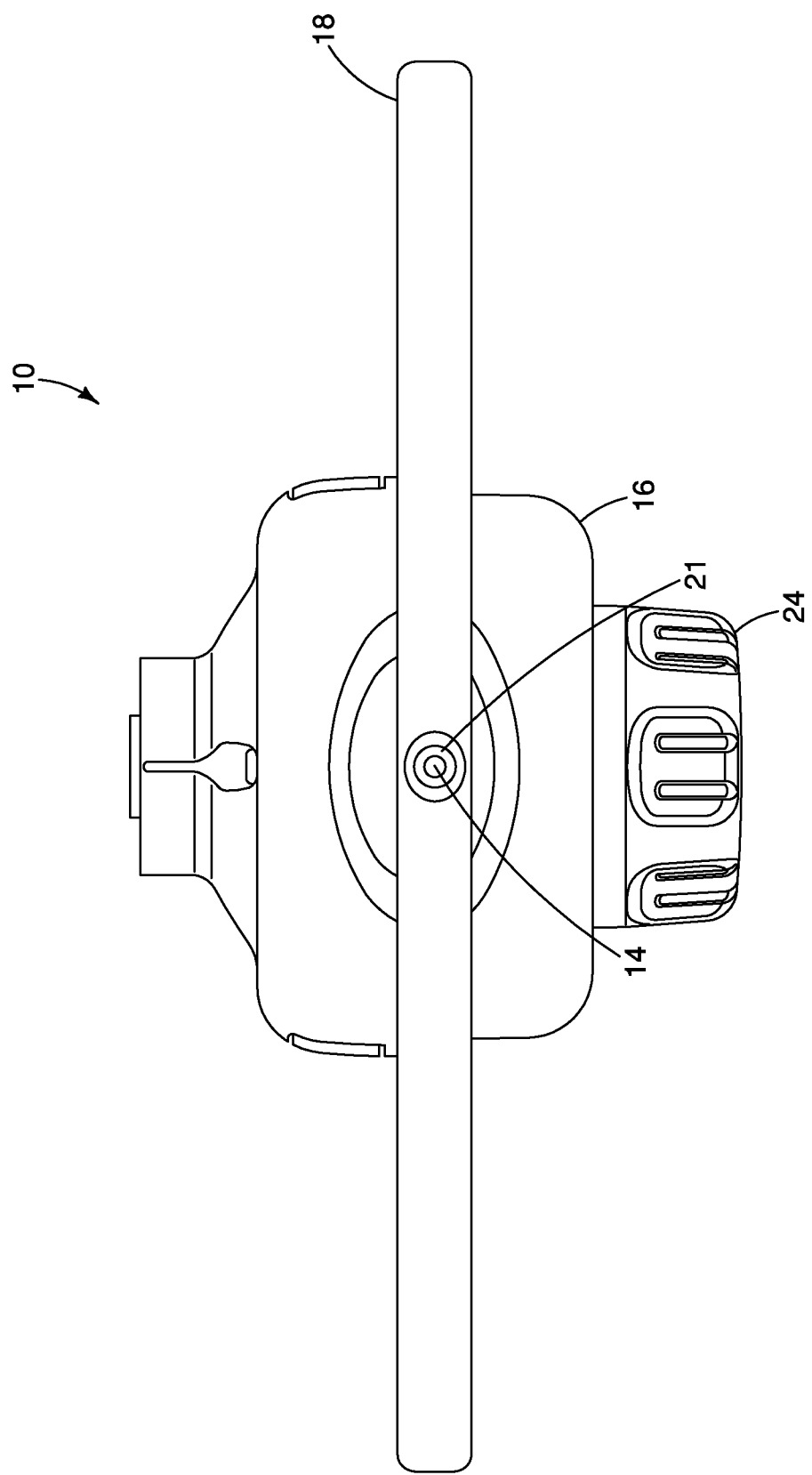
FIG. 4 is a side view of the hub-and-spoke trimmer head shown in FIG. 2
Figure 5:
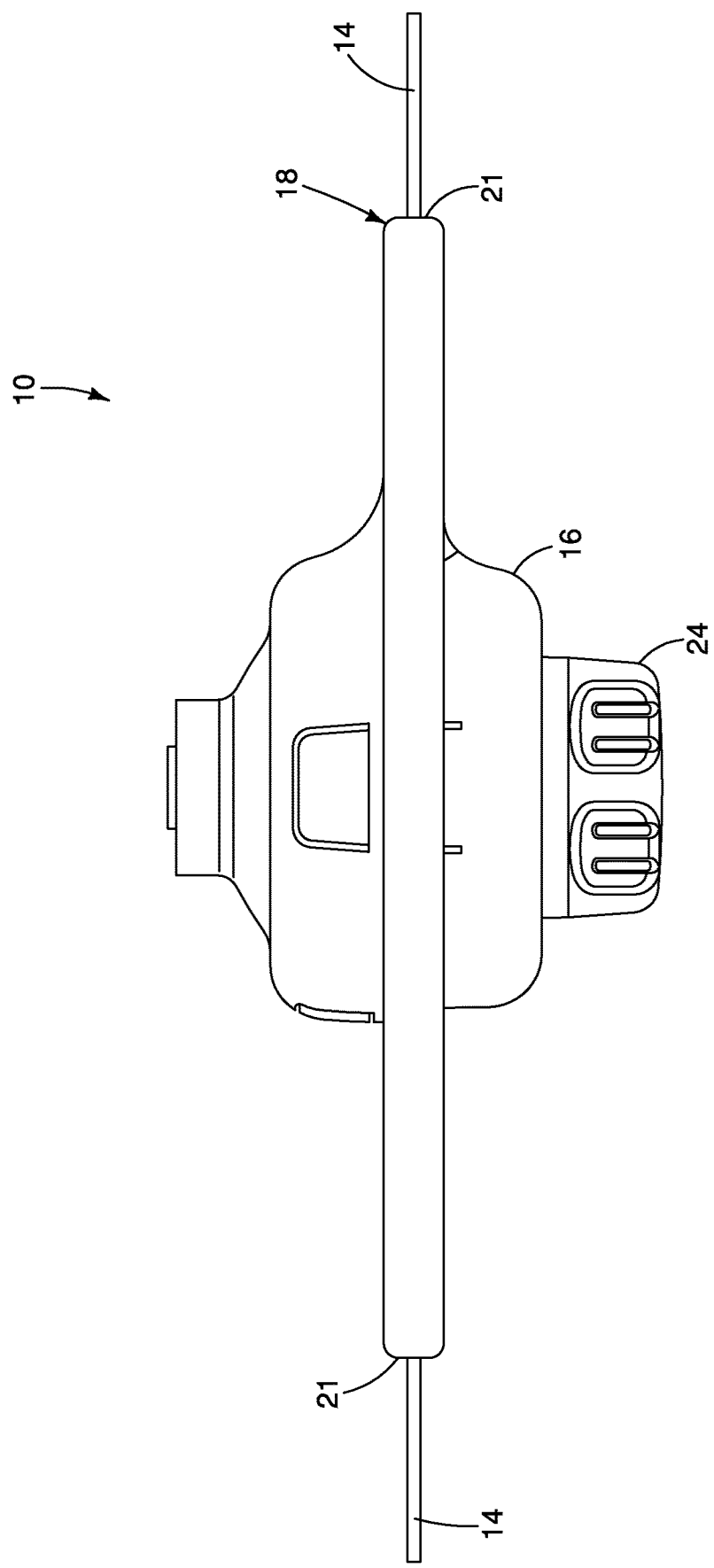
FIG. 5 is another side view of the hub-and-spoke trimmer head shown in FIG. 2.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 16:
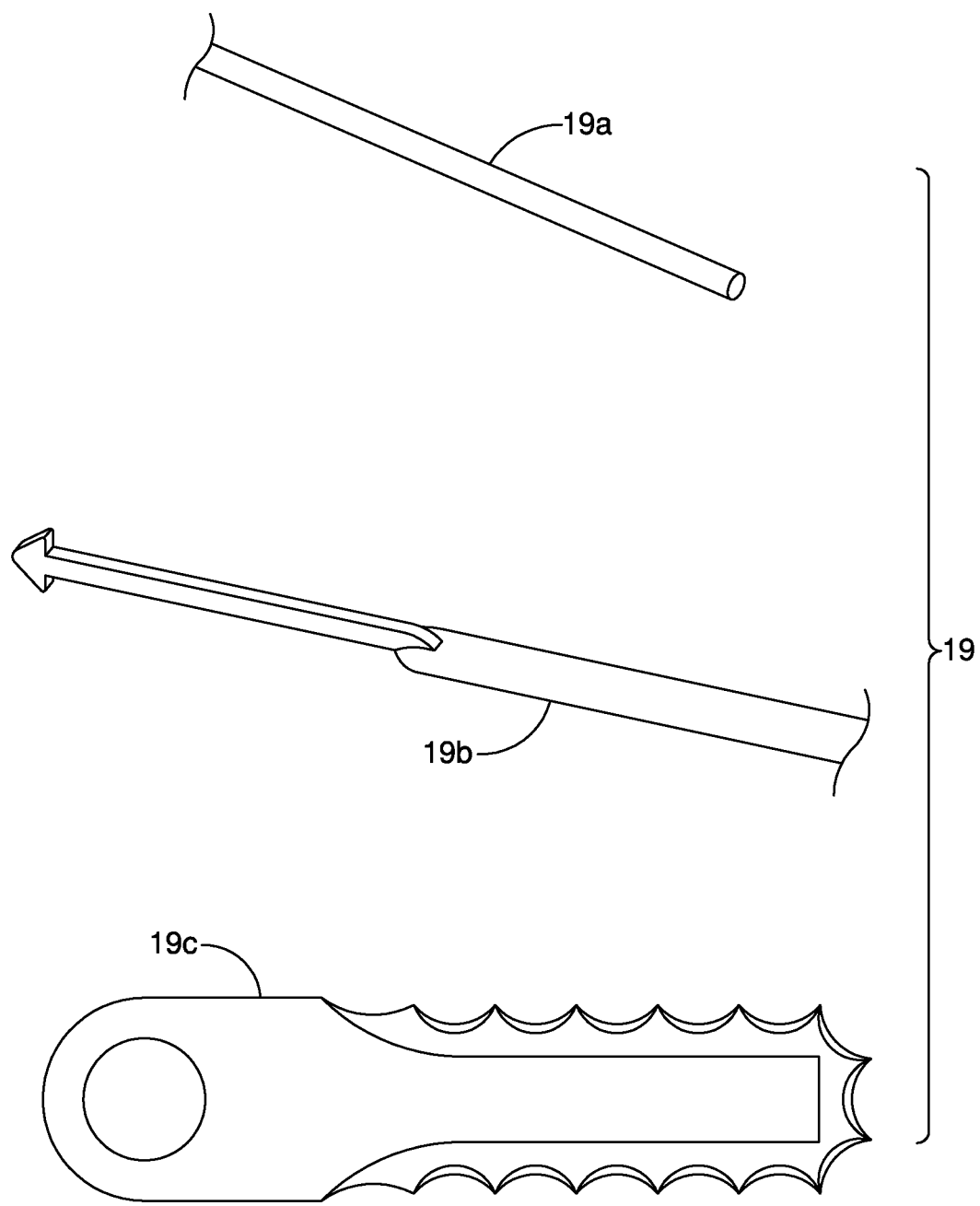
FIG. 16 is several embodiments of exemplary cutting members.

Referring to FIGS. 1-5, an exemplary embodiment of a trimmer head 10 for use on a handheld lawn maintenance tool 12 is shown. In the illustrated embodiment, the trimmer head 10 is configured to be a bump feed type trimmer head, but it should be understood by one having ordinary skill in the art that the trimmer head 10 may also be a fixed line-type trimmer head, a convertible trimmer head (between a fixed line and bump head operations), a cutting blade configuration, or a combination thereof. In an embodiment, the trimmer head 10 is configured to receive flexible trimmer line 14 that is stored on-board the trimmer head 10, wherein a length of the trimmer line 14 is selectively fed or otherwise extended from the trimmer head 10 in a bump operation, as will be described below. In an embodiment, the trimmer head 10 is configured to be rotatable in both the clockwise and counter-clockwise directions by the lawn maintenance tool 12. In another embodiment the trimmer head 10 is configured to only rotate in either the clockwise or the counterclockwise direction, but the trimmer head 10 remains capable of rotating in either rotational direction. The trimmer head 10 is formed in a general hub-and-spoke configuration having a central hub 16, a circular rim 18 spaced apart from the hub 16, and a plurality of spokes 20 extending between the hub 16 and the rim 18. At least one cutting member 19 extends radially outward from the rim 18. The cutting member 19 can be formed as a monofilament trimmer line 19a, a shaped trimmer line 19b, or a cutting blade 19c, or other known cutting members used on trimmer heads for cutting vegetation, as shown in FIG. 16. The monofilament trimmer line 19a is a generally flexible trimmer line used for a bump-feed operation. The shaped trimmer line 19b is used for a fixed-line operation in which the shape of the trimmer line 19b is configured to positively secure the shaped trimmer line 19b within the hub 16 or spoke 20 of the trimmer head 10. The cutting blade 19c is a substantially rigid member having at least one cutting edge for cutting vegetation when the trimmer head 10 is rotated. It should be understood by one having ordinary skill in the art that the trimmer head 10 can use any type of cutting member 19 alone or in combination with another type of cutting member 19.

In some embodiments, the trimmer head 10 includes a bump knob 24 extending downwardly from the hub 16, wherein monofilament trimmer line 19a (FIG. 16) is stored within the hub 16 and is fed radially outward from the rim 18 in response to a bump operation in which the bump knob 24 is forced into contact with the ground or other hard surface. In other embodiment, the trimmer head 10 includes a plurality of pieces of shaped trimmer line 19b, wherein each piece of shaped trimmer line is secured within the hub 16 or within one of the arms and a portion of the shaped trimmer line 19b extends radially outward beyond the outer circumferential edge of the rim 18. In further embodiments, a plurality of cutting blades 19c are rotatably or fixedly connected to the trimmer head 10 such that the cutting blades extend beyond the outer circumferential edge of the rim 18. In some embodiments, a web 44 is positioned within the spaces defined between the hub 16, circular rim 18, and spokes 20.

In an embodiment, the trimmer line 14 is stored within the hub 16 and extends outwardly through at least one pathway located within one of the spokes 20, wherein the trimmer line 14 exits each pathway through the opening 21 thereto, as shown in FIGS. 2-5. A portion of trimmer line 14 extends from openings 21 formed through the outer circumferential edge of the rim 18. Although the embodiment of the trimmer head 10 illustrated in FIGS. 2-5 shows two spokes 20 and each spoke includes a single opening from which an end of a piece of trimmer line 14 extend radially outward from the trimmer head 10, it should be understood by one having ordinary skill in the art that the trimmer head 10 may include more than two spokes 20 with a corresponding pathway formed within each of the spokes 20 for receiving a portion of trimmer line 14 that extends from within the hub 16 through an opening 21 at the outer circumferential edge of the circular rim 18. The length of the trimmer line 14 that extends through the spokes 20—in addition to centrifugal force during rotation of the trimmer head 10—prevents the trimmer line 14 from being withdrawn back into the hub 16, which would otherwise require the trimmer head 10 to be disassembled and the trimmer line 14 be re-threaded through the spoke(s) 20. Instead, if the portion of trimmer line 14 extending from one side of the trimmer head 10 breaks off, the remaining portion of the trimmer line 14 extending within the spoke 20 is able to be remain within the pathway of the spoke 20 and is then extended or fed outwardly from the rim 18 upon a bump operation of the trimmer head 10.

The circular rim 18 positions a portion of the weight of the trimmer head 10 at a spaced-apart distance from the hub 16. Although the initial energy required to begin rotating the trimmer head 10 can sometimes be greater than typical bump head-style trimmer heads, the energy required to continue rotating the trimmer head 10 is less than typical bump head-style trimmer heads. As shown in FIGS. 2-5, the length of trimmer line 14 extending from each opposing side of the circular rim 18 is shorter than the length of trimmer line 14 extending between the hub 16 and the exit of the circular rim 18 through the spoke 20. Because the trimmer line 14 exits the trimmer head 10 at a location substantially spaced-apart from the rotational axis of the trimmer head (compared to conventional bump feed-type trimmer heads), the rotational velocity of the trimmer head 10 can be reduced while still generating an equivalent rotational velocity of the tip of the trimmer line 14. This reduced rotational velocity of the trimmer head 10 provides an equivalent cut quality and reduces the noise generated by both the trimmer head (and trimmer line 14) and the engine of the lawn maintenance tool 12.

In the exemplary embodiment illustrated in FIGS. 6-12B, the trimmer head 10 includes a housing 22, a bump knob 24, a spool 26, and a spring 28. In some embodiments, the trimmer head 10 also includes a plurality of trimmer line tubes 30 positioned within the housing 22. In the illustrated embodiment, the housing 22 of the trimmer head 10 is formed of an upper disk body 32 and a lower disk body 34. It should be understood by one having ordinary skill in the art that the housing 22 can alternatively be formed as a single member.

The lower disk body 34 is formed of a lower core 38a, a lower rim 40a, and a plurality of lower arms 42a extending between the lower core 38a and the lower rim 40a, as shown in FIG. 9A-10C. In an embodiment, the lower disk body 34 includes a lower core 38a that is formed separately from a lower disk member 35, wherein the lower disk member 35 includes the lower arms 42a integrally formed with the lower rim 40a, as shown in FIGS. 8A-9C. The lower core 38a of the lower disk body 34 is releasably attachable to the upper disk body 32, wherein the lower disk member 35 is sandwiched between the upper disk body 32 and the lower core 38a to form the housing 22. In another embodiment, the lower disk body 34 includes the lower core 38a, lower rim 40a, and lower arms 42a integrally formed together as a single member, as shown in FIGS. 10A-10B. The lower core 38a of the integrally formed lower disk body 34 is releasably attachable to the upper disk body 32 to form the housing 22. A portion of the bump knob 24 is partially located within the housing 22, and another portion of the bump knob 24 extends downwardly from the housing 22. The spool 26 is located within the housing 22 between the upper and lower disk bodies 32, 34. In the illustrated embodiment, the spring 28 is positioned between the upper disk body 32 and the spool 26, wherein the spring 28 biases the spool 26 toward the lower disk body 34. In another embodiment, the spring 28 is positioned between the lower disk body 34 and the spool 26, wherein the spring 28 biases the spool 26 toward the upper disk body 32.

Figure 6A:
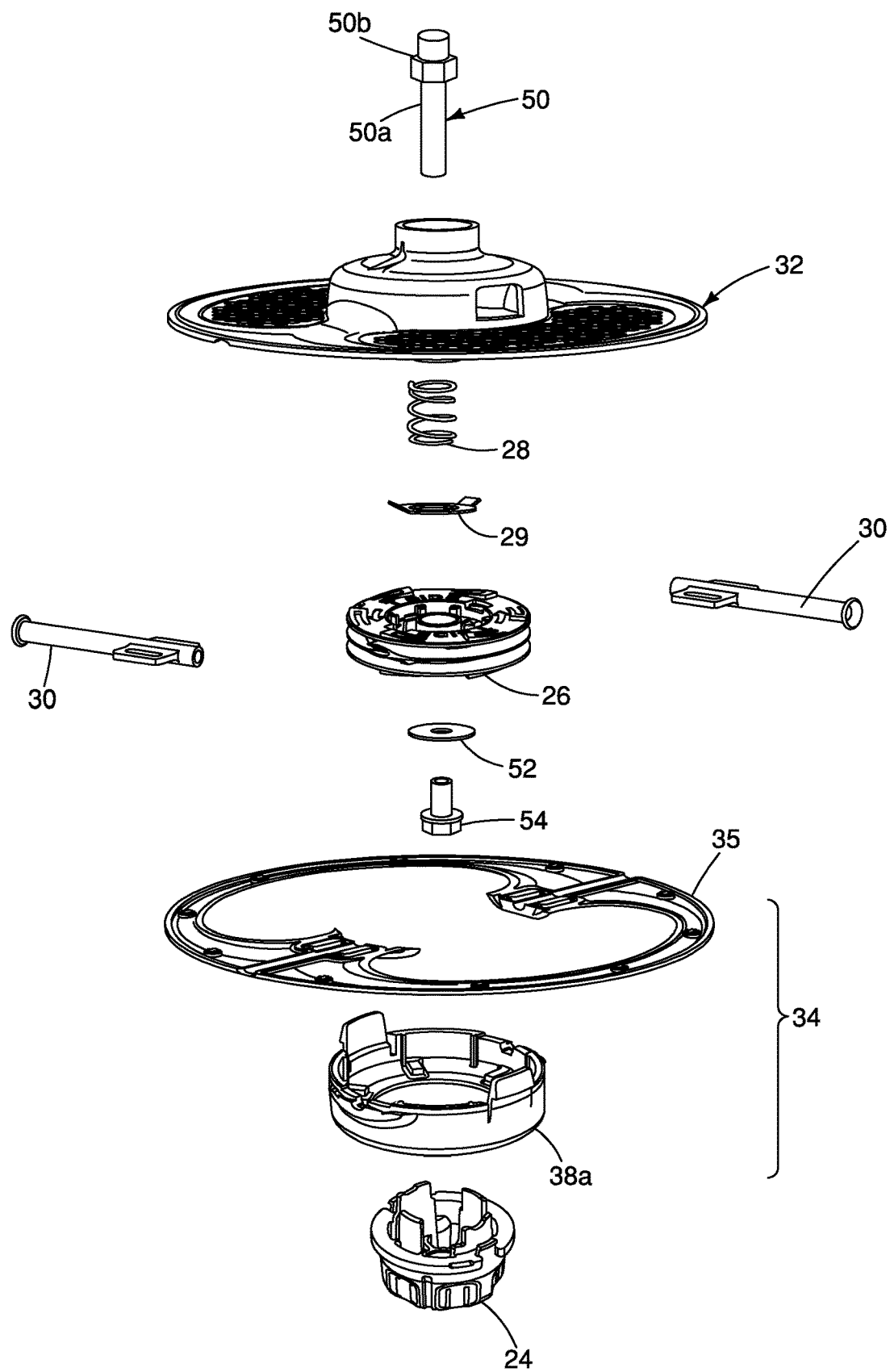
FIG. 6A is an exploded view of an embodiment of a trimmer head.

In the embodiment illustrated in FIGS. 1 and 6A, the trimmer head 10 is attachable to the handheld lawn maintenance tool 12 by way of an adapter 50 that extends downwardly from the end of the lawn maintenance tool 12. The adapter 50 is received within the upper disk body 32 and the spool 26. A bolt 54 is partially inserted through the spool 26, and the bolt 54 is threadingly engaged with the portion of the adapter 50 positioned within the spool 26. A washer 52 is positioned between the bolt 54 and the spool 26. The adapter 50 includes a tubular portion 50a and a nut 50b. The nut 50b is located adjacent to a distal end of the tubular portion 50a. The nut 50b of the adapter 50 is received within a recess within the upper disk body 32 having substantially the same shape of the nut 50b. The bolt 54 attaches to the adapter 50 in order to maintain the nut 50b within the recess of the upper disk body 32. The nut 50b is configured to engage the upper disk body 32 in order to transfer rotational movement from the motor (not shown) of the handheld lawn maintenance tool 12 to the housing 22 of the trimmer head 10.

Figure 7A:
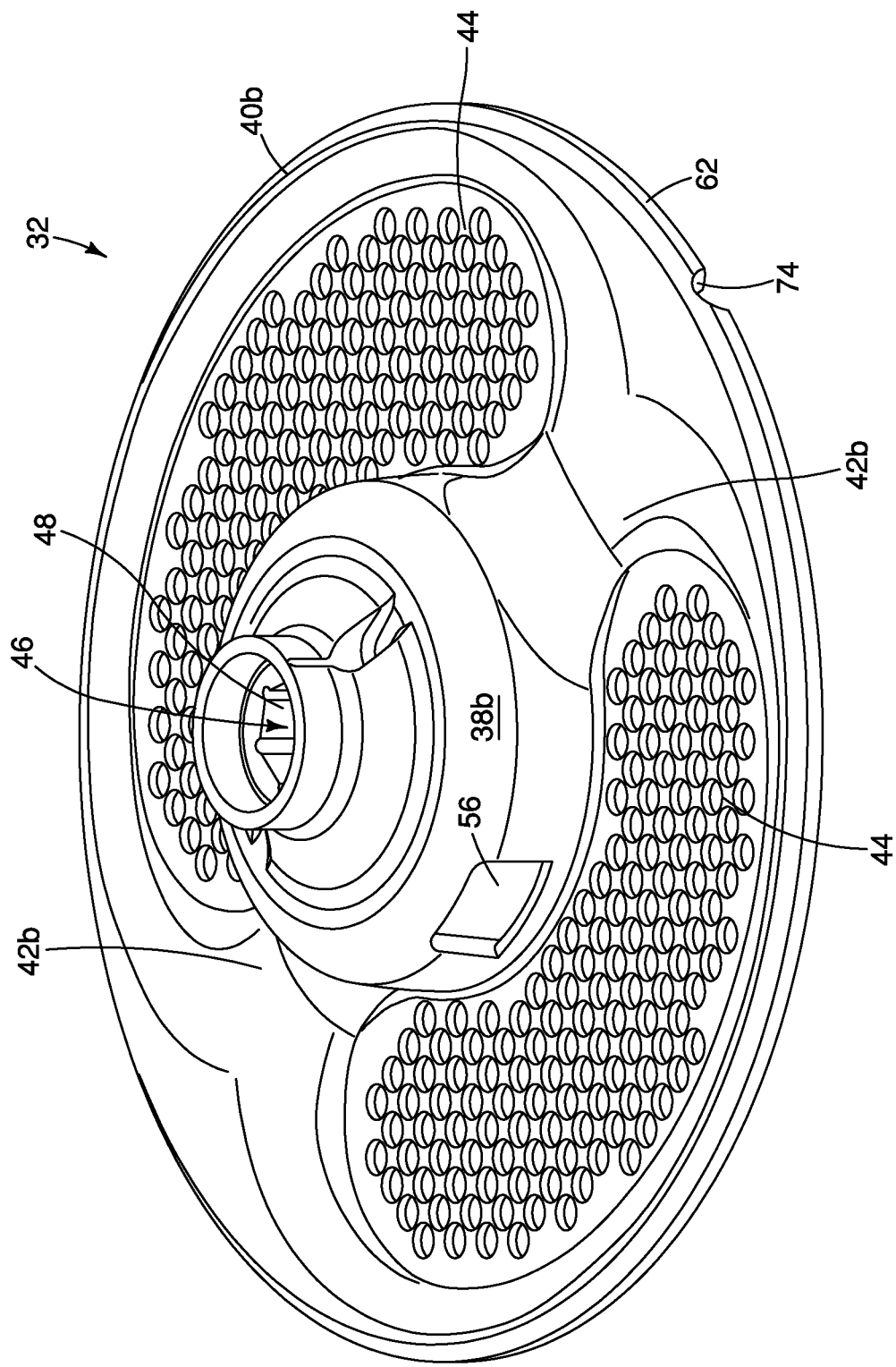
FIG. 7A is an isometric view of an embodiment of an upper disk body.
Figure 7B:
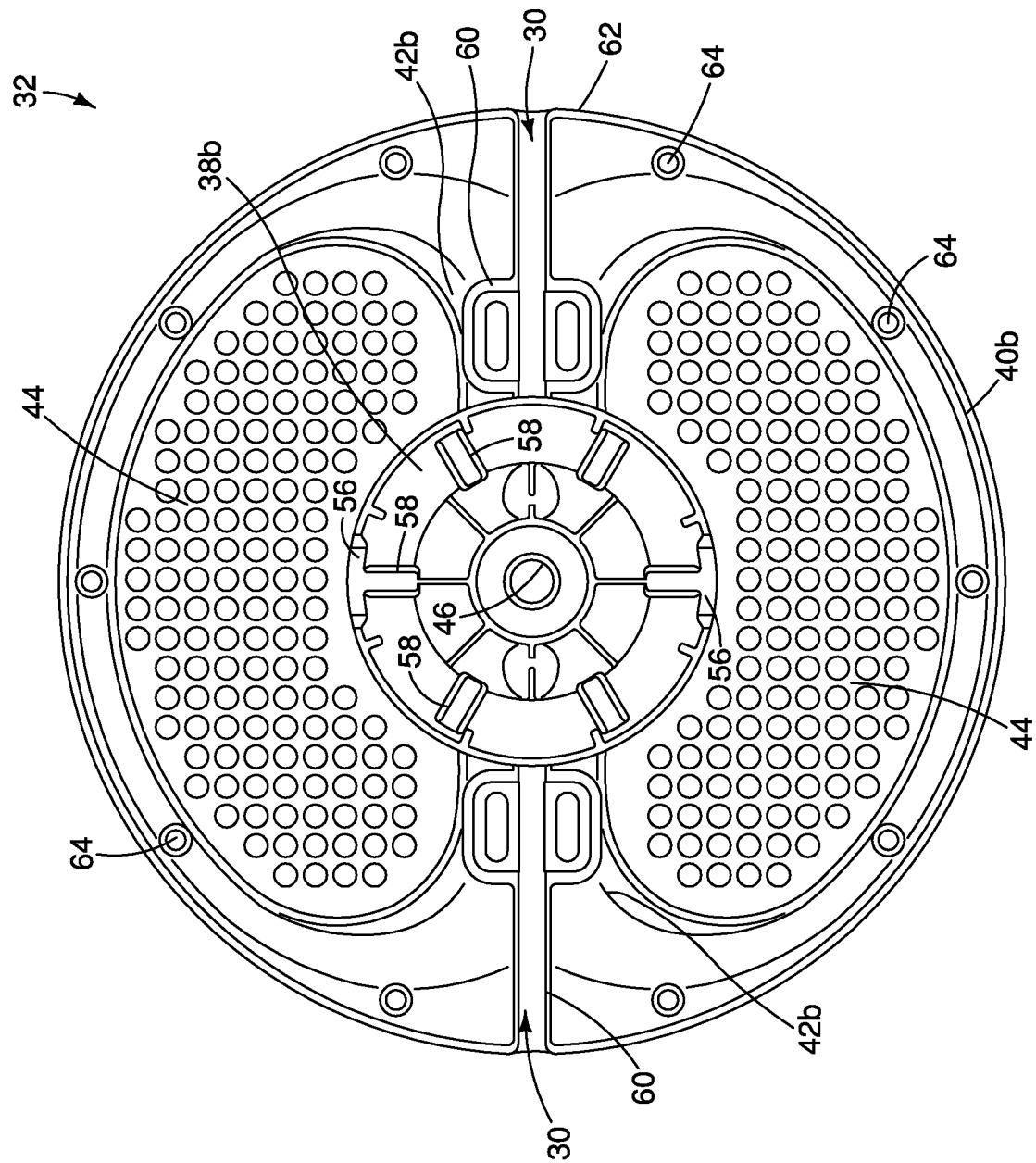
FIG. 7B is a bottom view of the upper disk body shown in FIG. 7A.
Figure 7C:
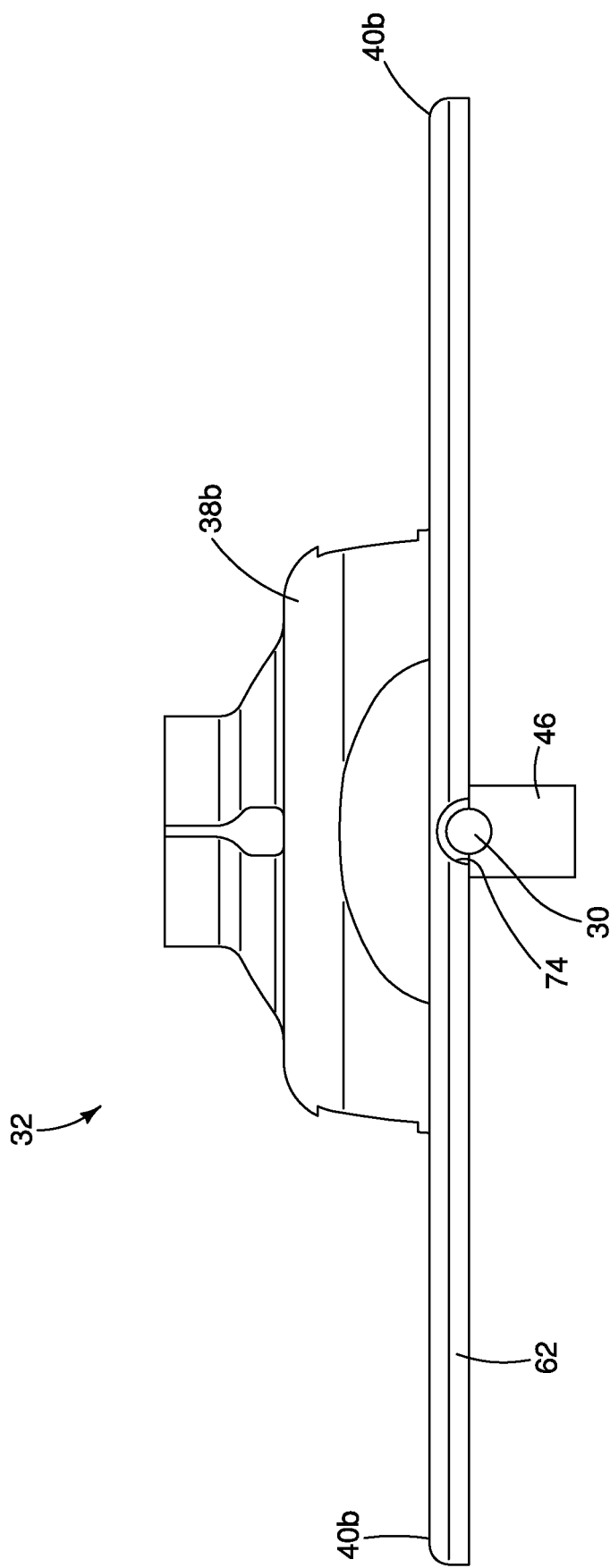
FIG. 7C is a side view of the upper disk body shown in FIG. 7A.

As shown in FIGS. 7A-7C, an exemplary embodiment of an upper disk body 32 is shown. The upper disk body 32 includes an upper core 38b, a rim 40b spaced apart from the upper core 38b, and a pair of upper arms 42b extending between the upper core 38b and the rim 40b. It should be understood by one having ordinary skill in the art that the upper disk body 32 can include two or more upper arms 42b extending between the upper core 38b and the upper rim 40b. In an embodiment, the spaces defined between the upper core 38b, the upper rim 40b, and the upper arms 42b are empty space that reduces the weight of the trimmer head 10. In the illustrated embodiment, each of the spaces defined between the upper core 38b, the upper rim 40b, and the upper arms 42b are filled with a web 44 that at least partially fills the open space(s). In an embodiment, the webs 44 are formed as a solid member that completely fills the empty spaces. In other embodiments, the webs 44 include a plurality of apertures formed therethrough in order to lighten the weight that the webs 44 add to the trimmer head 10. The webs 44 are configured to reduce or eliminate the amount of grass or other vegetation that could potentially extend up into the empty spaces during rotation of the trimmer head 10 such that the vegetation would come into contact with the upper and lower arms 42b, 42a thereby slowing the rotation trimmer head 10 (and requiring additional energy to maintain the selected rotational speed of the trimmer head 10).

In the embodiment of the upper disk body 32 illustrated in FIGS. 7A-7C, the upper core 38b is formed as cup-shaped member. The upper core 38b includes a receiving member 46 that extends into the center of the upper core 38b from the upper surface thereof. The receiving member 46 defines the rotational axis of the upper disk body 32. The receiving member 46 includes a recess 48 that extends downwardly from the upper surface of the upper disk body 32. The recess 48 is sized and shaped to receive the nut 50b of the adapter 50 while the tubular portion 50a is extendable through the receiving member 46. The receiving member 46 is formed as a hollow cylindrical tubular structure that extends into the upper disk body 32. The cylindrical inner wall of the receiving member 46 surrounds the tubular portion 50*a* of the adapter 50. The cylindrical outer wall of the receiving member 46 is received within the spool 26, wherein the spool 26 rotates about and slides relative to the cylindrical outer wall of the receiving member 46.

As shown in FIGS. 7A-7C, the upper core 38*b* of the upper disk body 32 further includes a pair of opposing connecting apertures 56 formed through the sidewalls of the cup-shaped upper core 38*b*. The connecting apertures 56 are generally square shaped. The connecting apertures 56 are configured to receive the connecting tabs 66 (FIG. 8A) that extend from the lower disk body 34. The connecting tabs 66 allow the lower disk body 34 to be selectively and releasably attachable to the upper disk body 32.

In an embodiment, the inner surface of the upper core 38*b* includes a plurality of ribs 58 extending downwardly from the upper surface thereof, as shown in FIG. 7B. The ribs 58 are oriented about the receiving member 46, wherein the ribs 58 are spaced evenly in a circumferential manner relative to the receiving member 46. In the illustrated embodiment, the upper core 38*b* includes six (6) ribs 58 that extend from the inner surface. It should be understood by one having ordinary skill in the art that the upper core 38*b* can include any number of ribs 58 extending downwardly from the inner surface. The ribs 58 are protruding structures that are configured to interact with the ramps 90 (FIG. 11A) located on the upper surface of the spool 26 in some embodiments of the trimmer head 10 so as to limit the amount of rotation of the spool 26 relative to the housing 22 during a bump operation.

In the illustrated embodiment, the upper disk body 32 includes a pair of upper arms 42*b* that are integrally formed with the upper core 38*b* and extend therefrom, as shown in FIGS. 7A-7C. It should be understood by one having ordinary skill in the art that the upper disk body 32 can include any number or upper arms 42*b* extending from and integrally formed with the upper core 38*b*. Each of the upper arms 42*b* extends between the upper core 38*b* and the circular upper rim 40*b* that is spaced apart from the upper core 38*b*. The pair of upper arms 42*b* extend radially outward in opposite directions from the upper core 38*b*. In the illustrated embodiment, the lateral width of each of the upper arms 42*b* increases as the upper arms 42*b* extend away from the upper core 38*b*, and the upper arms 42*b* have an upper curved surface adjacent to the upper core 38*b* due to an increased vertical thickness where the upper arms 42*b* transition into the upper core 38*b* (in the radially inward direction).

Figure 13A:
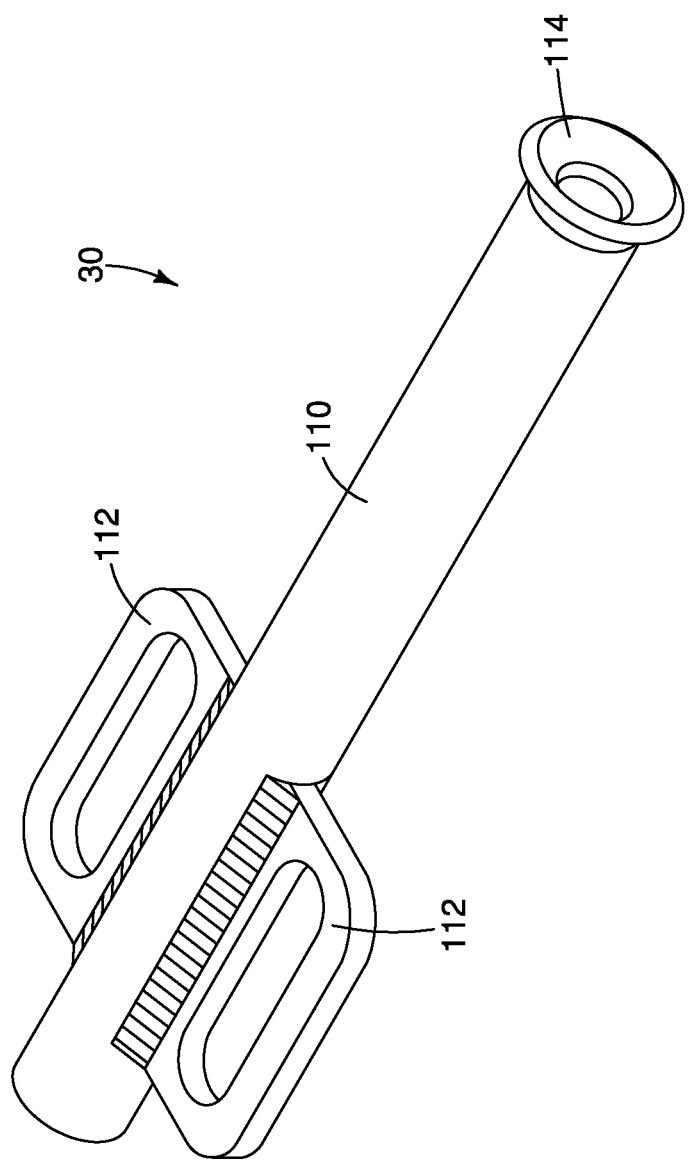
FIG. 13A is an isometric view of an embodiment of a trimmer line tube.
Figure 13C:
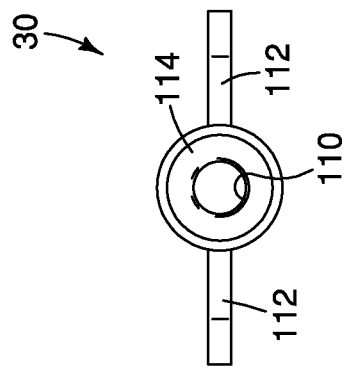
FIG. 13C is an end view of the trimmer line tube shown in FIG. 13A.
Figure 13B:
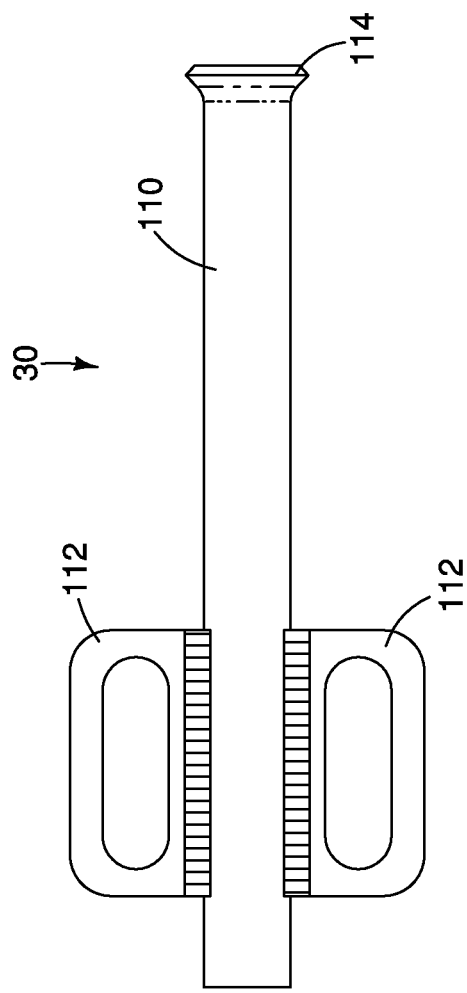
FIG. 13B is a side view of the trimmer line tube shown in FIG. 13A.

As shown in FIG. 7B, each upper arm 42*b* includes a depression 60 formed into the lower surface thereof. The shape of the depressions 60 correspond to the shape of the trimmer line tubes 30 (FIGS. 13A-13C) as each of the depressions 60 is configured to receive one of the trimmer line tubes 30. Each depression 60 extends radially outward from the sidewall of the upper core 38*b* to the outer circumferential edge 62 of the upper rim 40*b*. The depression 60 includes a portion for receiving the cylindrical tubular portion of the trimmer line tube 30 as well as opposing stabilizers portions thereof. In other embodiments, each depression 60 is formed as a semi-cylindrical recess formed into the lower surface of the corresponding upper arm 42*b*, wherein the depression 60 is configured to receive a cylindrical trimmer line tube 30 that extends from the upper core 38*b* to the outer circumferential edge 62 of the upper rim 40*b*. In further embodiments, each depression 60 is formed as a semi-cylindrical recess formed into the lower surface of the corresponding upper arm 42*b*, wherein the depression 60 is configured to provide a pathway between the upper core 38*b* and the outer circumferential edge 62 of the upper rim 40*b* for allowing a piece of trimmer line to extend from within the core to a location radially outward from the outer circumferential edge 62.

As shown in FIGS. 7A-7C, the upper disk body 32 includes a circular upper rim 40*b* that completely surrounds the upper core 38*b* in a concentric manner. The upper rim 40*b* is integrally formed with the upper arms 42*b* that extend from the upper core 38*b*. In an embodiment, a plurality of attachment mechanisms 64 are formed into the lower surface of the upper rim 40*b*, wherein the attachment mechanisms 64 are evenly spaced about the upper rim 40*b*. The attachment mechanisms 64 are configured to engage corresponding attachment mechanism 64 on the lower disk body 34 in order to provide a positive connection between the two members so as to ensure that the rims 40*a*, 40*b* of the upper and lower disk bodies 32, 34 remain engaged. Without this positive engagement of the rims 40*a*, 40*b* the upper and lower disk bodies 32, 34 may separate from each other, thereby generating a gap between the rims 40*a*, 40*b* resulting in a partial or complete unspooling of the trimmer line 14 or even breakage of upper or lower disk bodies 32, 34. In the illustrated embodiment, the attachment mechanisms 64 are formed as snap engagement members. However, it should be understood by one having ordinary skill in the art that the attachment mechanisms 64 can be formed of any mechanical fastening mechanism that allows for an easy securing means between the rims 40*a*, 40*b* of the upper and lower disk bodies 32, 34 so as to ensure continuous engagement of the upper and lower disk bodies 32, 34 during operation of the trimmer head 10.

Figure 8A:
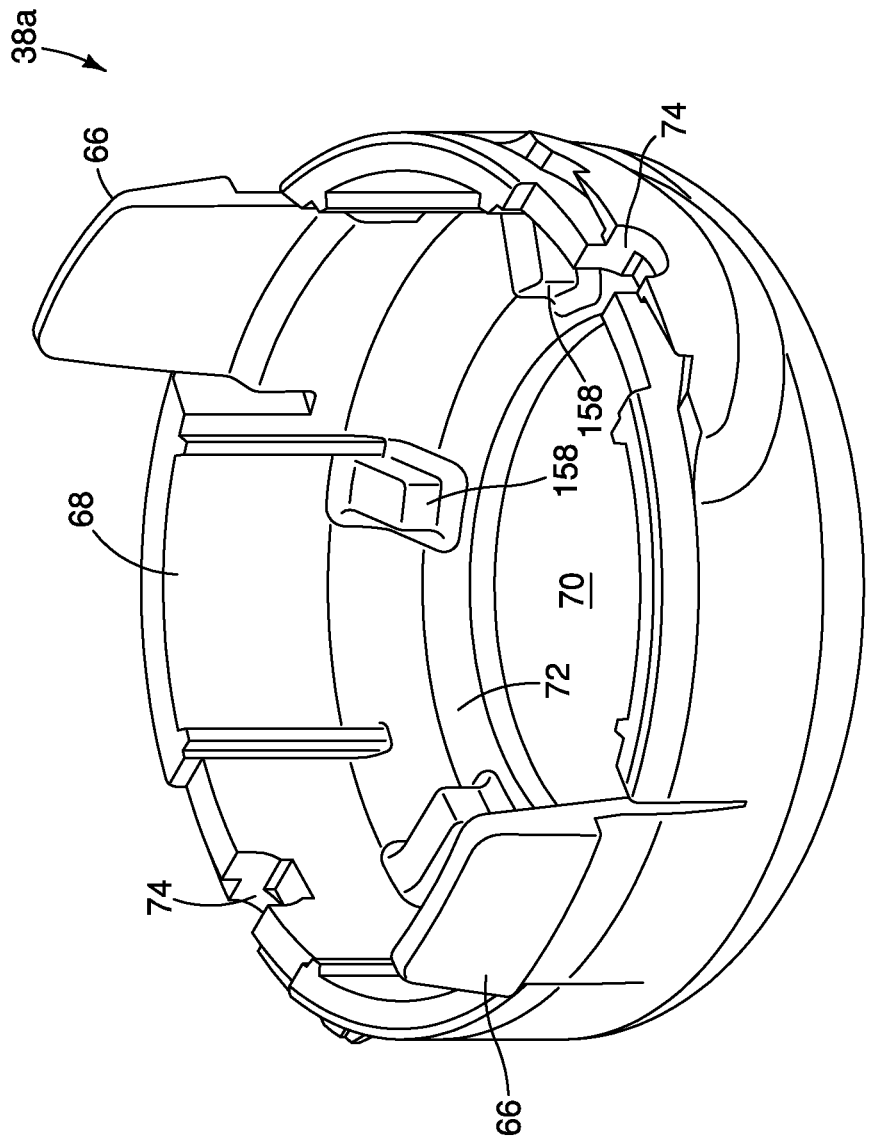
FIG. 8A is an isometric view of an embodiment of a lower core.
Figure 8B:
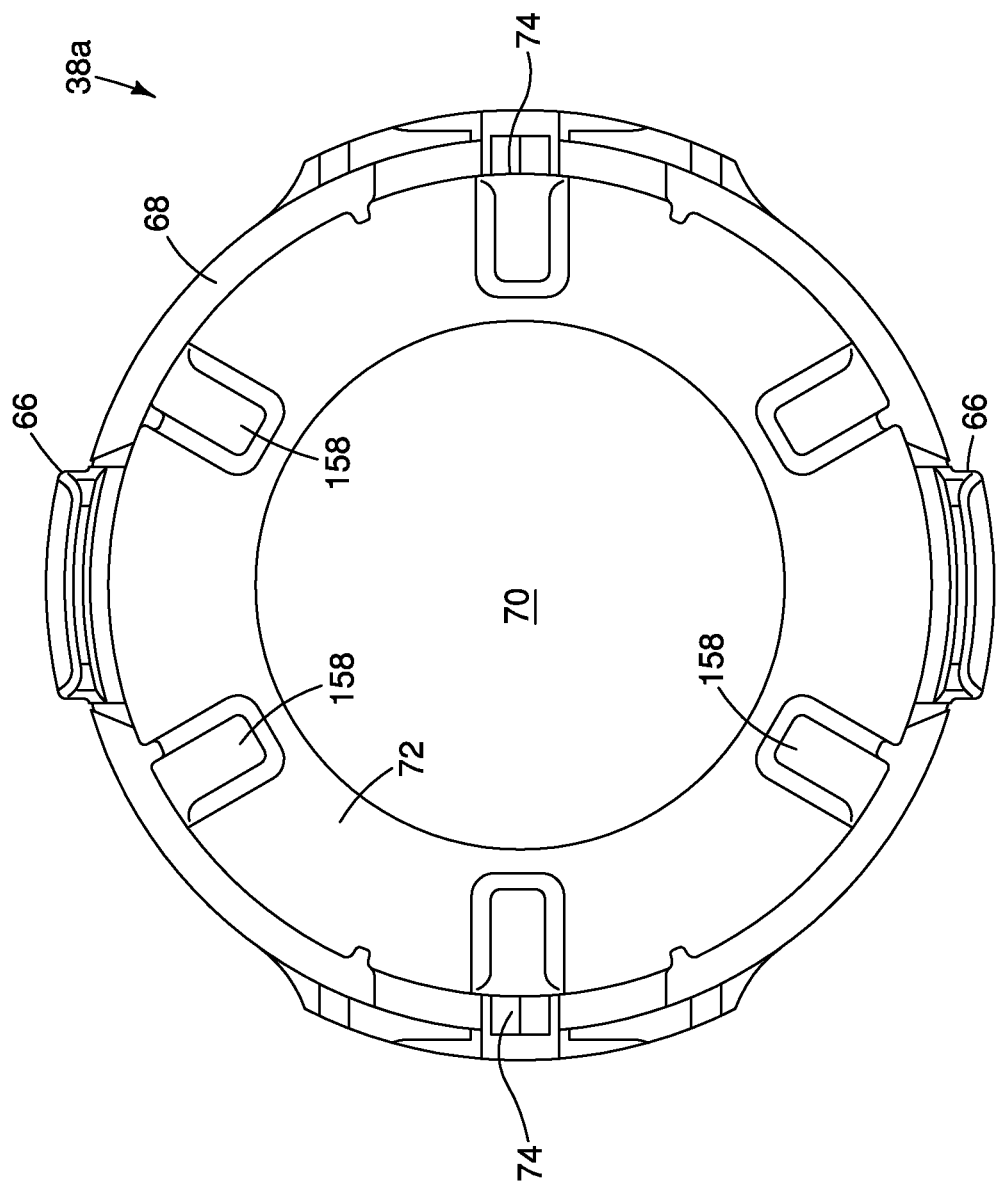
FIG. 8B is a top view of the lower core shown in FIG. 8A.
Figure 8C:
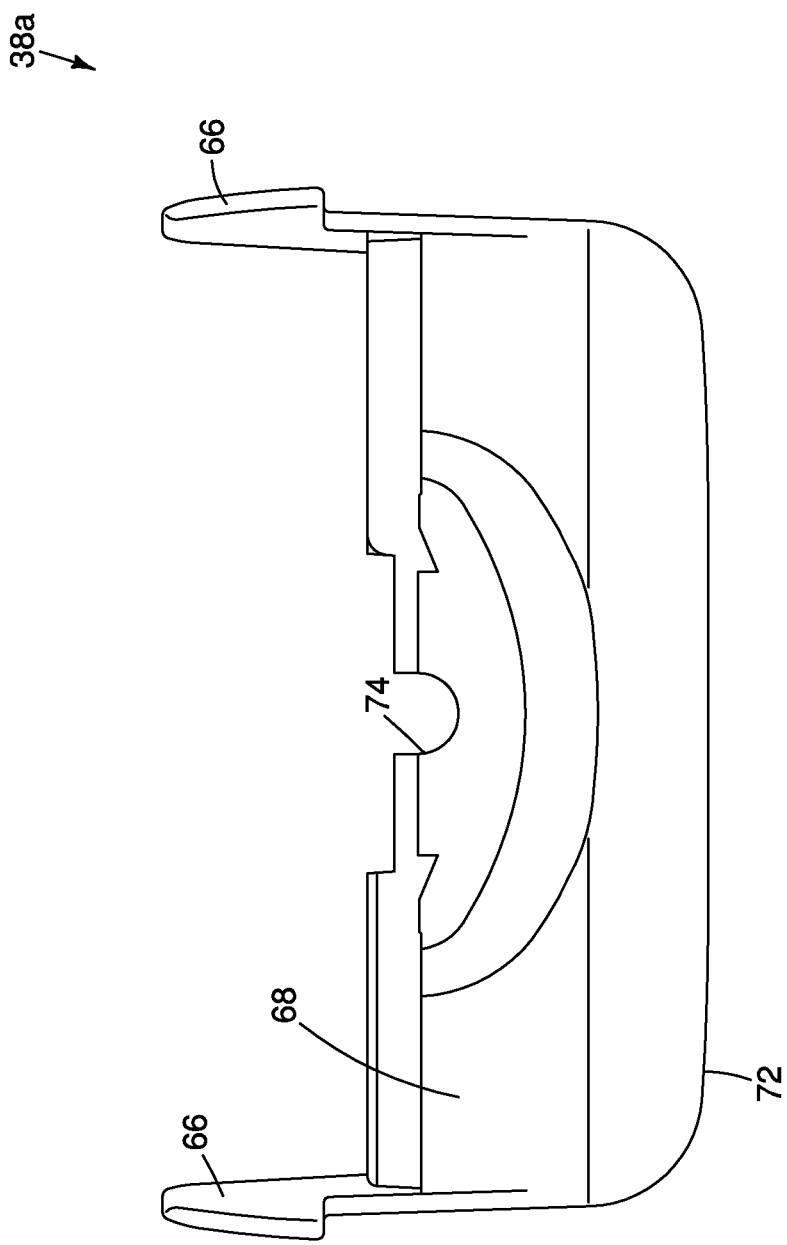
FIG. 8C is a side view of the lower core shown in FIG. 8A.

An exemplary embodiment of a lower core 38*a* of the lower disk body 34 is shown in FIGS. 8A-8C. The lower core 38*a* is formed as a cup-shaped member similar to the upper core 38*b* of the upper disk body 32. The lower core 38*a* includes a pair of connecting tabs 66 that extend upwardly from the sidewall 68 of the lower core 38*a*. The connecting tabs 66 of the lower core 38*a* are configured to be received within the connecting apertures 56 of the upper disk body 32 for selectively attaching the lower disk body 34 to the upper disk body 32. The lower core 38*a* further includes a bump aperture 70 formed into the lower wall 72 of the lower core 38*a*. The bump aperture 70 is configured to allow a portion of the bump knob 24 to extend outwardly from within the lower core 38*a*. The edge of the lower wall 72 that defines the bump aperture 70 abuts a rim of the bump knob 24 in order to maintain a portion of the bump knob 24 within the housing 22. In an embodiment, the bump aperture 70 is a circular opening in the lower wall 72, wherein the shape of the bump aperture 70 corresponds to the cross-sectional shape of the bump knob 24. It should be understood by one having ordinary skill in the art that bump aperture 70 can be formed of any shape, so long as the shape of the bump aperture 70 is substantially the same as the cross-sectional shape of the bump knob 24.

In an embodiment, the lower core 38*a* includes a plurality of ribs 158 formed on the inner surface thereof, as shown in FIG. 8A. The ribs 158 extend between the lower wall 72 and the sidewall 68 of the lower core 38*a*, wherein the ribs 158 extend inwardly from the inner surface of the lower core 38*a*. The ribs 158 are configured to engage ramps 90 formed on the spool 26, wherein the engagement between the ramps 90 and the ribs 158 formed in the lower core 38*a* prevents the trimmer line 14 from inadvertent unwinding as a result of the unintended rotation of the spool 26 during operation of the trimmer head 10. In the illustrated embodiment, the lower core 38a includes six (6) ribs 158 that are oriented in a spaced-apart manner about the inner circumference of the lower core 38a. It should be understood by one having ordinary skill in the art that the lower core 38a may include any number of ribs 158 extending from the inner surface thereof.

Figure 6B:
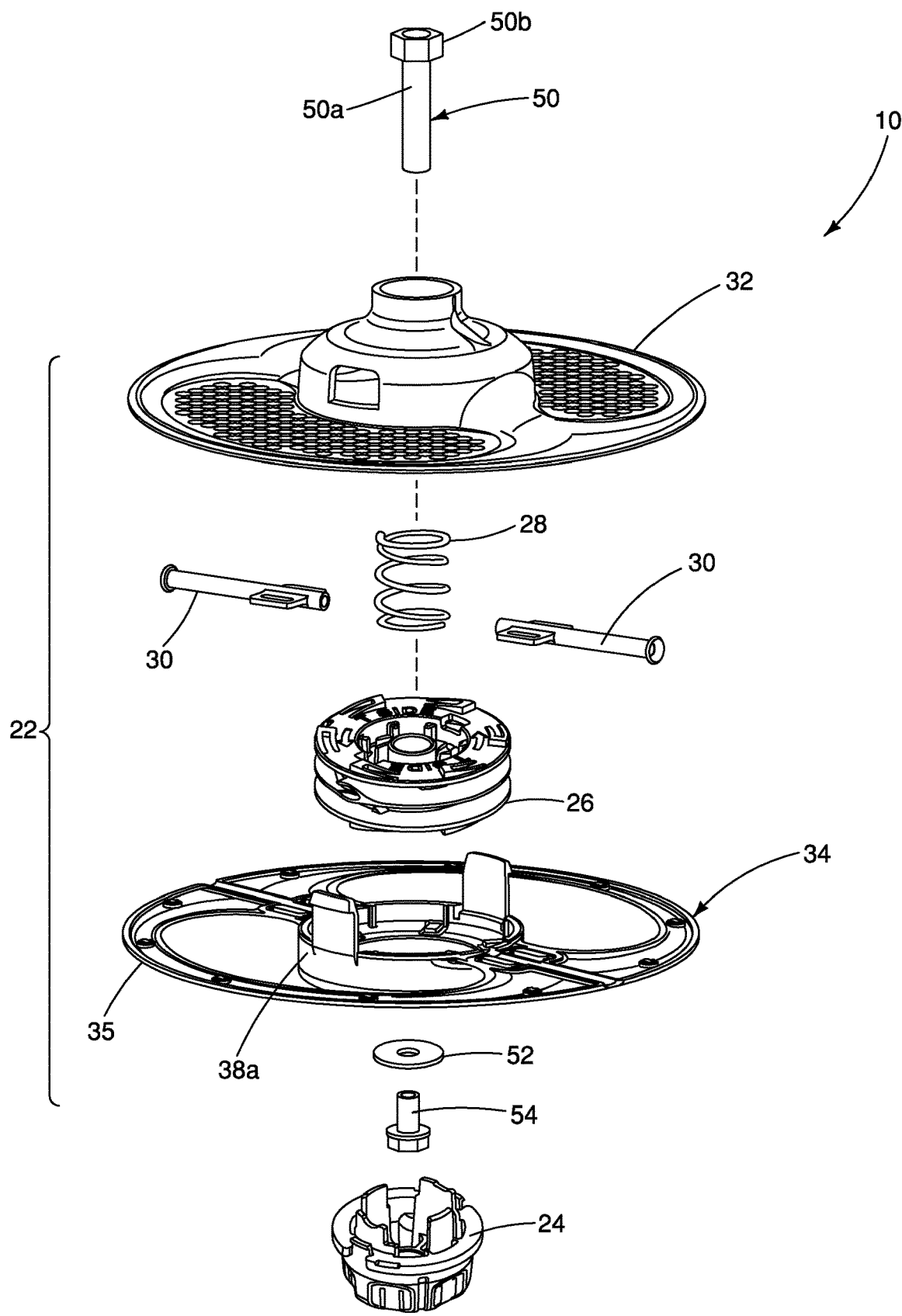
FIG. 6B is an exploded view of another embodiment of a trimmer head.

As shown in FIGS. 8A-8C, the illustrated embodiment of the lower core 38a of the lower disk body 34 includes a pair of notches 74 formed into the upper edge of the sidewall 68. The notches 74 are formed as semi-circular recesses, wherein each notch 74 is configured to receive either a piece of trimmer line 14 or an end of one of the trimmer line tubes 30 (FIG. 6A-6B).

Figure 9A:
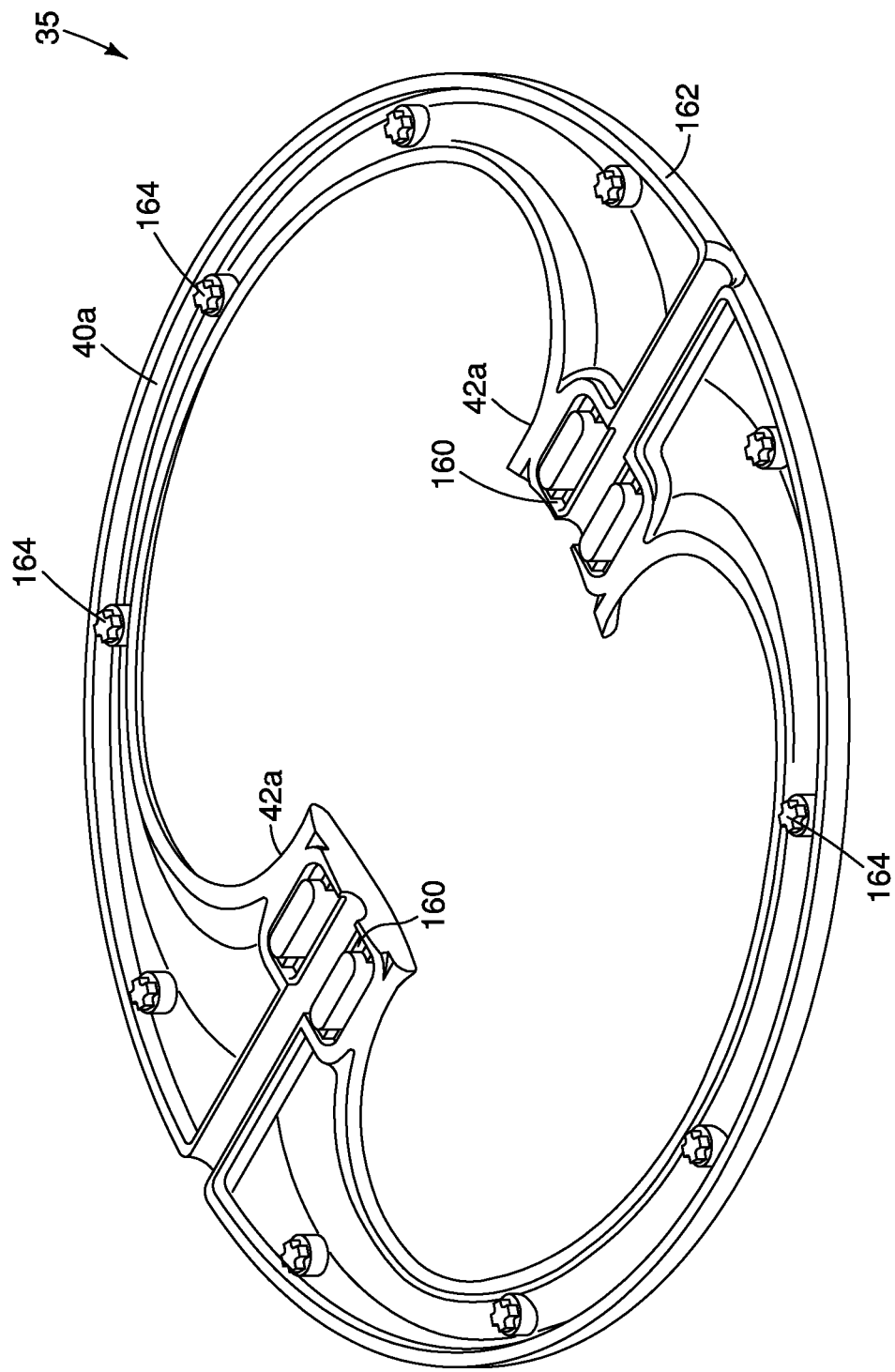
FIG. 9A is an isometric view of an embodiment of a lower disk member.

FIGS. 9A-9C illustrate an embodiment of a lower disk member 35 of the lower disk body 34. The lower disk member 35 is positioned, or sandwiched, between the lower core 38a and the upper disk body 32 during assembly of the trimmer head 10. The lower disk member 35 includes a pair of opposing lower arms 42a that extend radially outward and are integrally formed with a circular lower rim 40a. It should be understood by one having ordinary skill in the art that the lower disk member 35 can include any number or lower arms 42a extending to the lower rim 40a. The pair of lower arms 42a extend radially outward in opposite directions from each other. In the illustrated embodiment, the lateral width of each of the lower arms 42a increases as the lower arms 42a extend outwardly, and the lower arms 42a have an increased vertical thickness adjacent to the end of the lower arms 42a nearest the center of rotation of the lower disk member 35.

As shown in FIG. 9B, each lower arm 42a includes a depression 160 formed into the lower surface thereof. The shape of the depressions 160 correspond to the shape of the trimmer line tubes 30 as each of the depressions 160 is configured to receive one of the trimmer line tubes 30. Each depression 160 extends radially outward from the radially innermost end of the lower arm 42a to the outer circumferential edge 162 of the lower rim 40a. The depression 160 includes a portion for receiving the cylindrical tubular portion of the trimmer line tube 30 as well as opposing stabilizers portions thereof. In other embodiments, each depression 60 is formed as an elongated semi-cylindrical recess formed into the lower surface of the corresponding lower arm 42a, wherein the depression 160 is configured to receive a cylindrical trimmer line tube 30 that extends to the outer circumferential edge 162 of the lower rim 40a but without the stabilizers. In further embodiments, each depression 160 is formed as a semi-cylindrical recess formed into the lower surface of the corresponding lower arm 42a, wherein the depression 160 is configured to provide a pathway between the lower core 38a and the outer circumferential edge 162 of the lower rim 40a for allowing a piece of trimmer line to extend along the length of the lower arm 42a to (and radially beyond) the outer circumferential edge 162.

As shown in FIGS. 9A-9C, the lower disk member 35 includes a lower rim 40a that is integrally formed with the lower arms 42a. In an embodiment, a plurality of attachment mechanisms 164 are formed into the upper surface—or the surface directed toward the upper disk body 32 when the trimmer head 10 is assembled—of the lower rim 40a, wherein the attachment mechanisms 164 are evenly spaced about the lower rim 40a. The attachment mechanisms 164 of the lower disk member 35 are configured to engage corresponding attachment mechanisms 64 on the upper disk body 32 in order to provide a positive connection between the two members so as to ensure that the rims 40a, 40b of the upper and lower disk bodies 32, 34 remain engaged during operation of the trimmer head 10. In some embodiments, the attachment mechanisms 64, 164 provide only an abutting connection such as a protrusion received within a corresponding boss instead of a positive, releasably fixed connection.

Figure 10A:
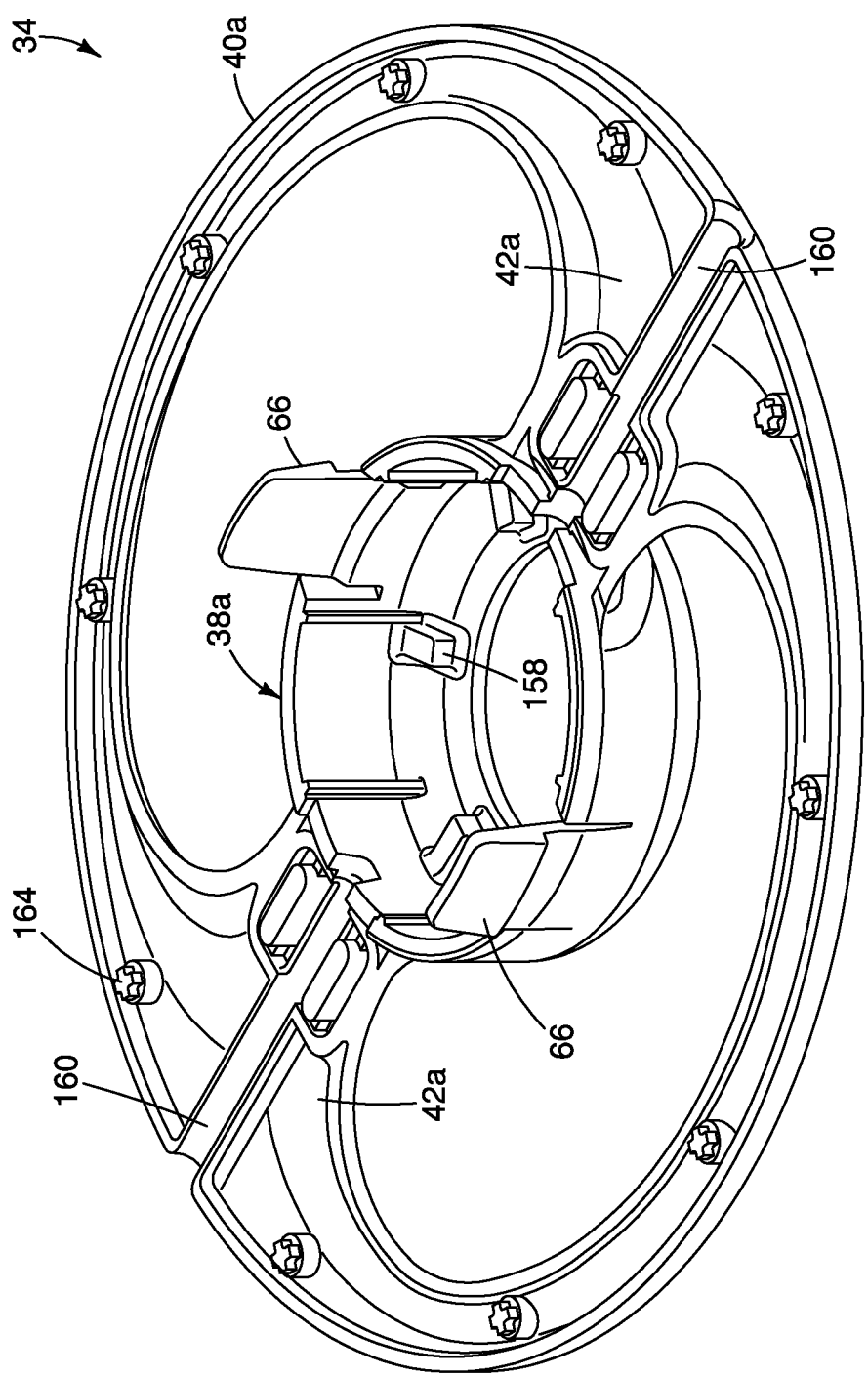
FIG. 10A is an isometric view of an embodiment of a lower disk body.
Figure 10B:
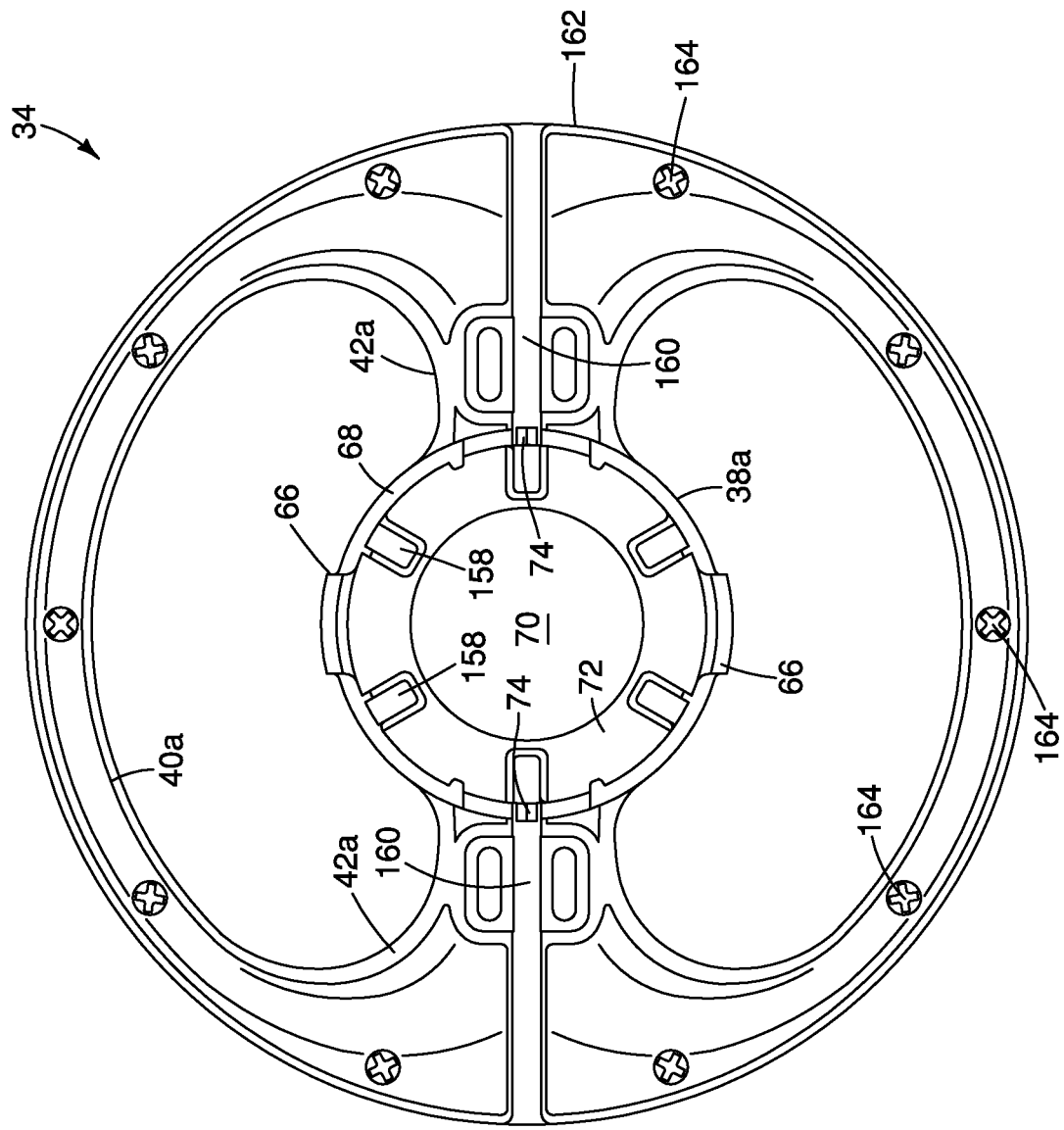
FIG. 10B is an isometric view of the lower disk body shown in FIG. 10A.
Figure 11A:
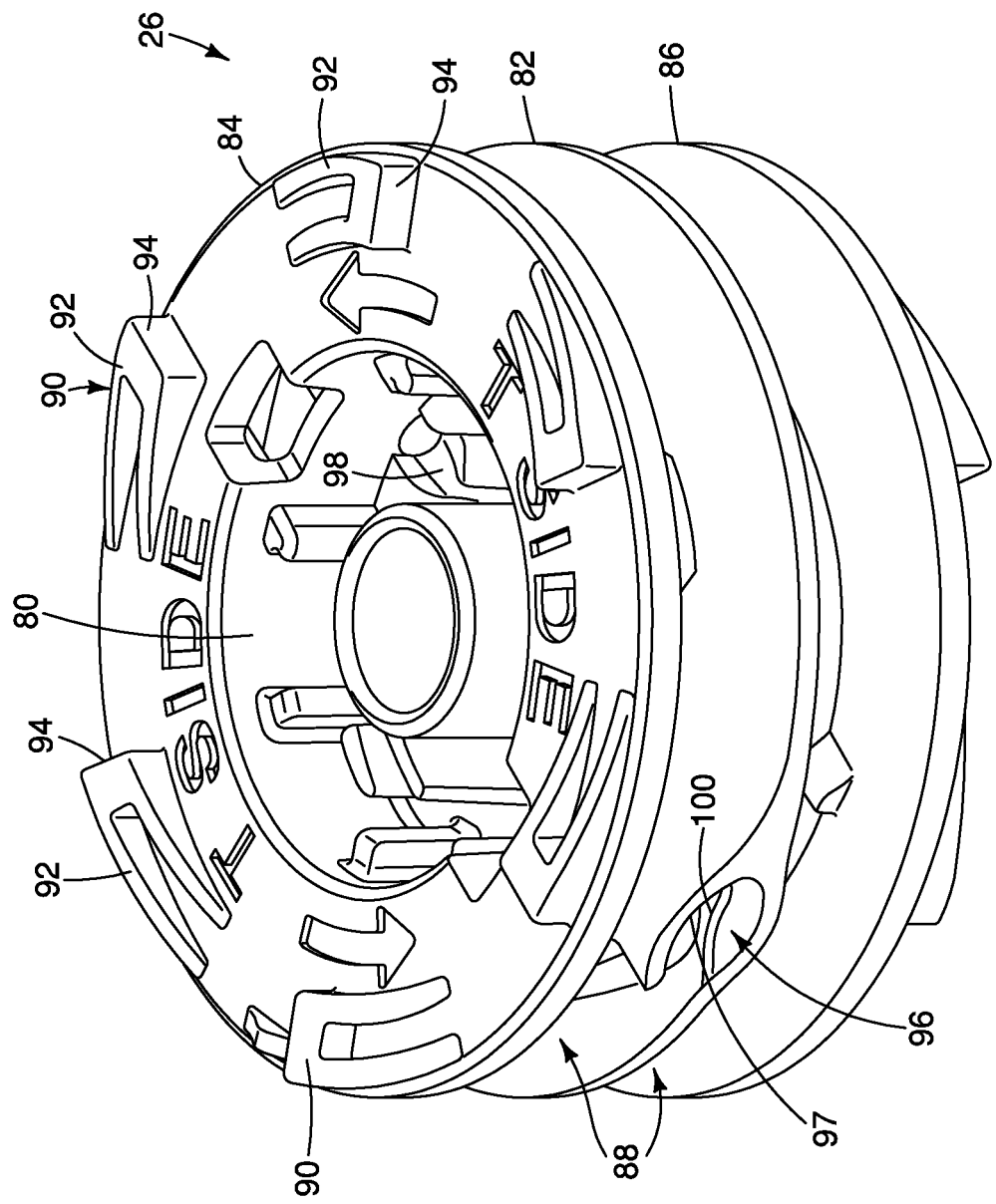
FIG. 11A is an isometric view of an embodiment of a spool.
Figure 11C:
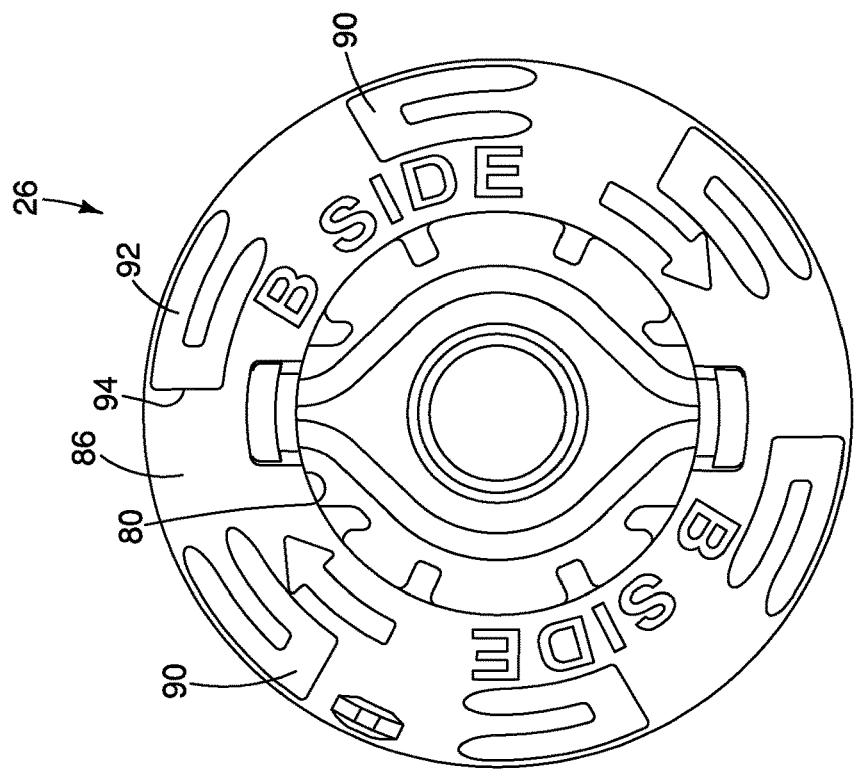
FIG. 11C is a bottom view of the spool shown in FIG. 11A.
Figure 11B:
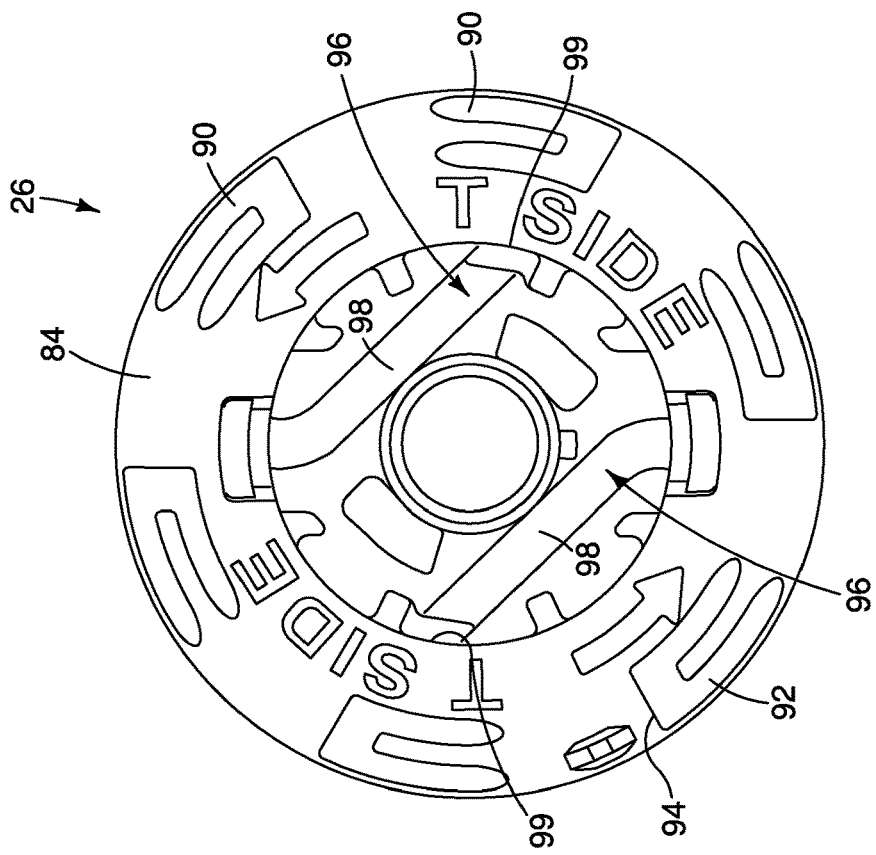
FIG. 11B is a top view of the spool shown in FIG. 11A.
Figure 11E:
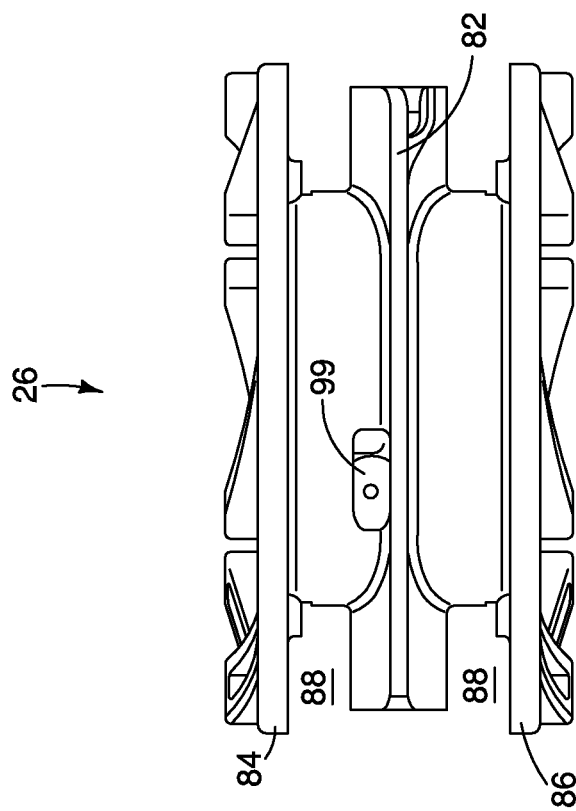
FIG. 11E is another side view of the spool shown in FIG. 11A.
Figure 11D:
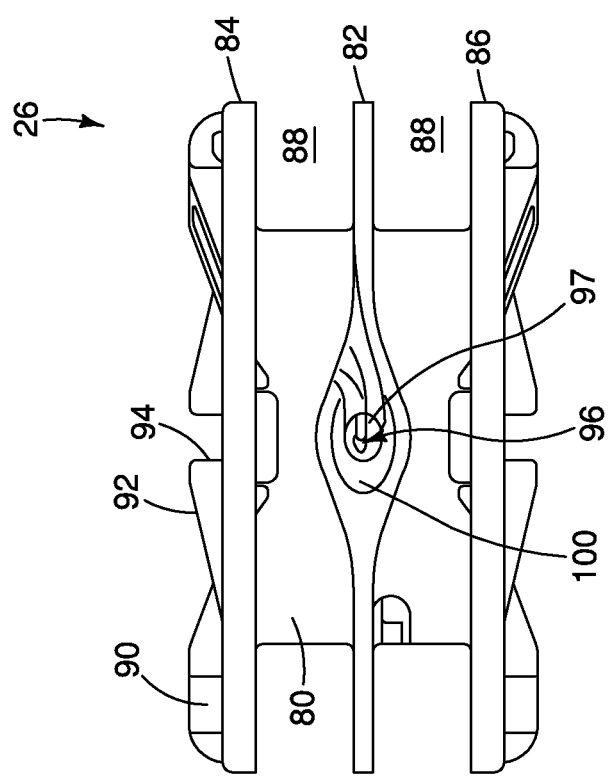
FIG. 11D is a side view of the spool shown in FIG. 11A.
Figure 11F:
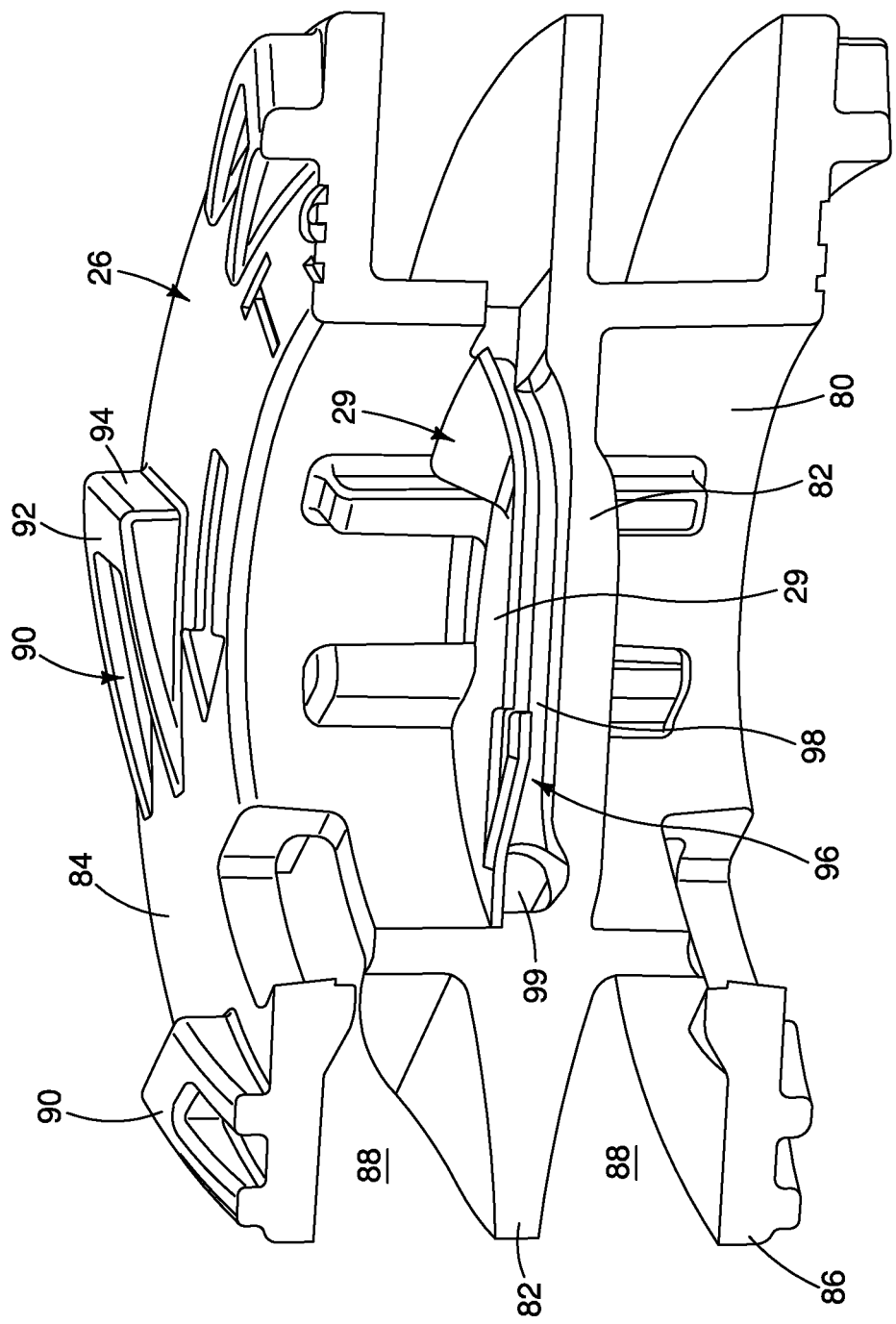
FIG. 11F is a cross-sectional view of the spool and a cover plate.
Figure 11G:
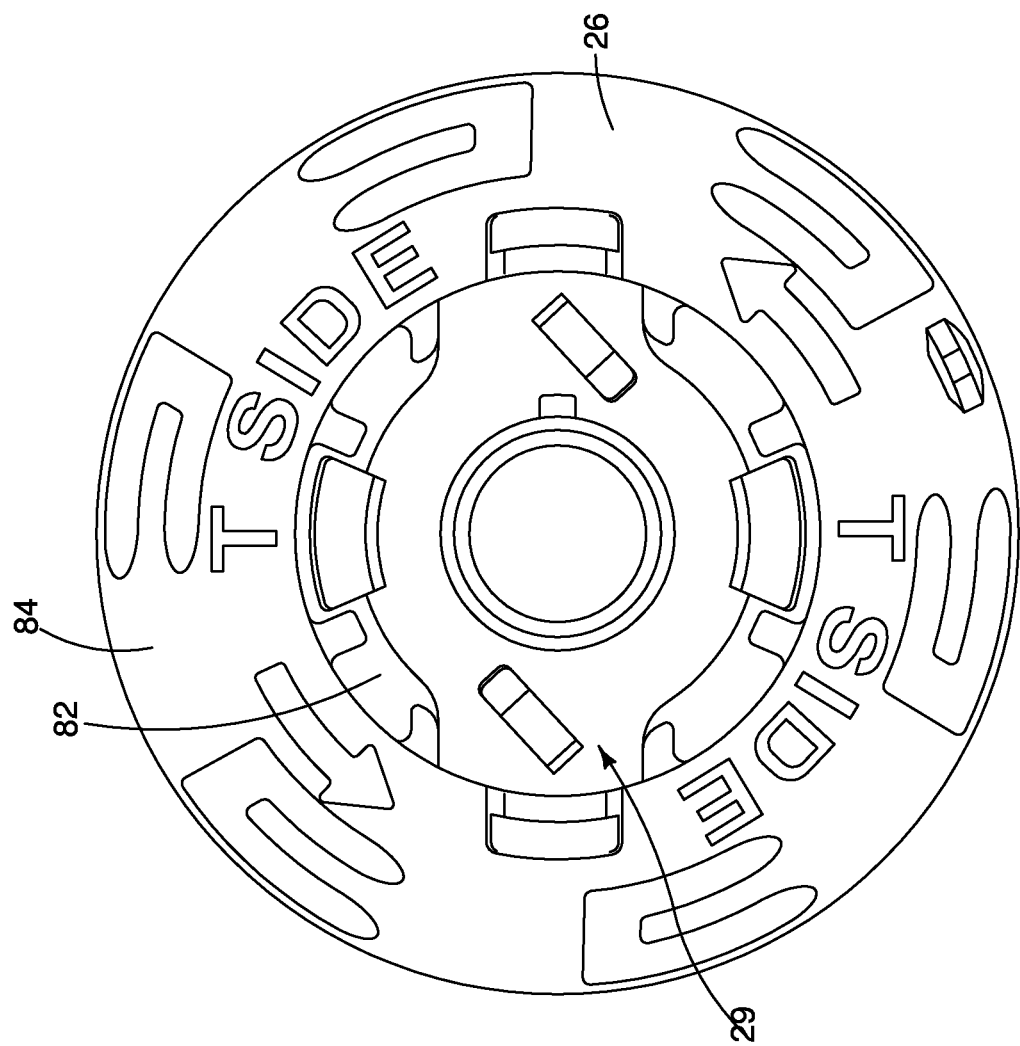
FIG. 11G is a top view of the spool and the cover plate.

FIGS. 10A-10C illustrate an embodiment of a lower disk body 34 wherein the lower core 38a, the lower rim 40a, and the lower arms 42a are integrally formed together. The structures of the lower disk member 35 and the lower core 38a described above with respect to FIGS. 8A-9C are the same as the integrally formed lower disk body 34 shown in FIGS. 10A-10C, except that the free ends of the lower arms 42a of the lower disk member 35 are integrally formed with the sidewall 68 of the lower core 38a.

An exemplary embodiment of the spool 26 for carrying at least one piece of trimmer line 14 is illustrated in FIGS. 11A-11E. The spool 26 is rotatably supported within the housing 22 of the trimmer head 10. The spool 26 includes a core 80 about which the piece(s) of monofilament trimmer line 19a (FIG. 16) are wrapped. The core 80 is a generally cylindrical wall forming a hollow tubular structure. In an embodiment, the spool 26 includes a central flange 82, an upper flange 84, and a lower flange 86, wherein the upper and lower flanges 84 are positioned on opposing sides of the central flange 82. A portion of the central flange 82 extends radially outward from the core 80 and another portion of the central flange 82 is positioned within the core 80. The portion of the central flange 82 located within the core extends across the entire area defined by the core 80, and the thickness of the portion of the central flange 82 located within the core 80 is less than the height of the core 80 itself. The upper and lower flanges 84, 86 extend radially outward from the core 80, and neither the upper flange 84 nor the lower flange 86 has a portion thereof located within the core 80.

As shown in FIGS. 11A-11E, the upper flange 84 is located at one end of the core 80 of the spool 26, and the lower flange 86 is located at the opposing end of the spool 80 to facilitate wrapping pieces of trimmer line 14 around the spool 26. The upper and lower flanges 84, 86, in combination with the central flange 82, form a pair of adjacent channels 88. An upper channel 88 is formed between the upper flange 84 and the central flange 82, and a lower channel 88 is formed between the lower flange 86 and the central flange 82. The channels 88 are configured to receive trimmer line 14 that is wound about the outer surface of the core 80.

As shown in FIGS. 11A-11E, the spool 26 further includes a plurality of the ramps 90 formed on both the upper and lower flanges 84, 86. Each ramp 90 includes a sloped surface 92 and a stop surface 94, wherein the sloped surface 92 is a surface that raises at an angle from the outer surface of the flange. The stop surface 94 is a generally flat surface that extends between the raised end of the sloped surface 92 and the outer surface of the flange. The ramps 90 are oriented in a concentric manner relative to the core 80 such that the ramps 90 are slightly curved along their length. In the illustrated embodiment, the ramps 90 formed on the upper flange 84 are oriented in the opposite direction than the ramps 90 formed on the lower flange 86. When the upper flange 84 is positioned adjacent to the upper disk body 32, the ramps 90 on the upper flange 84 are selectively engageable with the ribs 58 of the upper disk body 32 and the ramps 90 on the lower flange 86 are selectively engageable with the ribs 158 of the lower core 38a.

In the embodiment of the spool 26 illustrated in FIGS. 11A-11E, the spool 26 is configured to receive two separate pieces of trimmer line 14, wherein each piece of trimmer line 14 is windable about the core 80 and stored within a separate channel 88. The spool 26 includes two separate trimmer line channels 96 formed into the central flange 82, wherein each trimmer line channel 96 includes at least a pathway 97 extending into a groove 98. The pathway 97 of each trimmer line channel 97 extends from a location adjacent to the outer circumferential edge of the central flange 82 to the core 80. The pair of pathways 97 extend radially outward in opposite directions from opposing sides of the core 80. The pathways 97 are formed as fully-enclosed tubular conduits having an opening 100 positioned adjacent to the outer circumferential edge of the central flange 82. The opposing end of each pathway 97 is an aperture or opening through the thickness of the core 80. Each pathway 97 joins a separate corresponding groove 98 formed into the upwardly directed surface of the portion of the central flange 82 located within the core 80. Each of the grooves 98 is formed as an open valley or depression that extends into the upper surface of the central flange 82. In the illustrated embodiment, each groove 98 extends between the aperture through which the groove 98 and the corresponding pathway 97 merge through the thickness of the core 80 and exits through an exit aperture 99 formed through the core 80 at a location on the opposite side of the core 80 (or near such a location). In other embodiments (not shown), the grooves 98 extend only partially across the width of the core 80, wherein the end of the groove 98 is located within the core 80. In an embodiment, both of the grooves 98 are formed into the same surface of the portion of the central flange 82 located within the core 80, as shown in the illustrated embodiment. In other embodiments, each of the pair of grooves 98 is formed into an opposing surface of the portion of the central flange 82 located within the core 80.

As shown in FIG. 6, the spring 28 is positioned between the spool 26 and the upper disk body 32. The spring 28 is positioned within the core 80 and surrounds the receiving member 46 that extends from the upper disk body 32. The spring 28 is configured to bias the spool 26 away from the upper disk body 32. The spring 28 is formed as a coil spring.

Figure 12A:
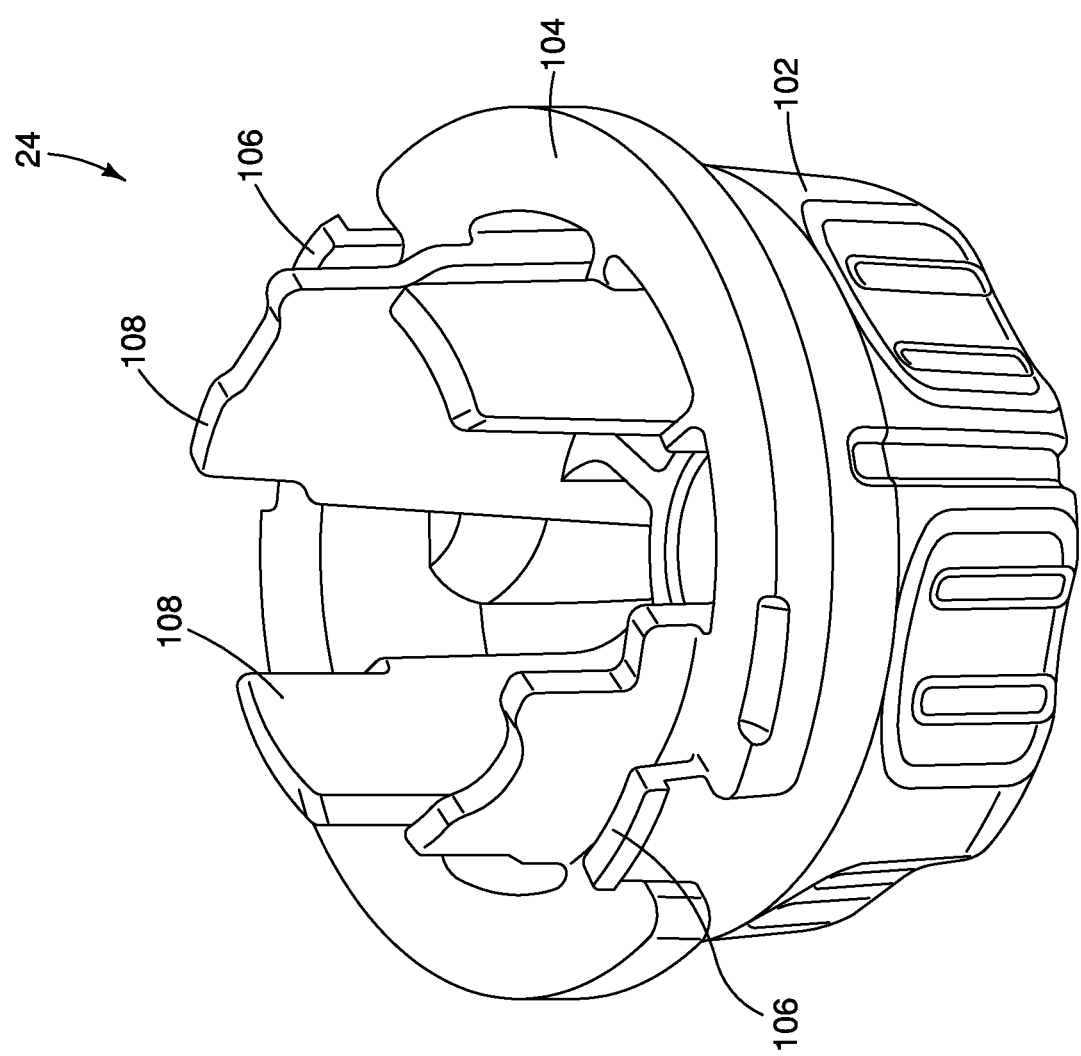
FIG. 12A is an isometric view of an embodiment of a bump knob.
Figure 12C:
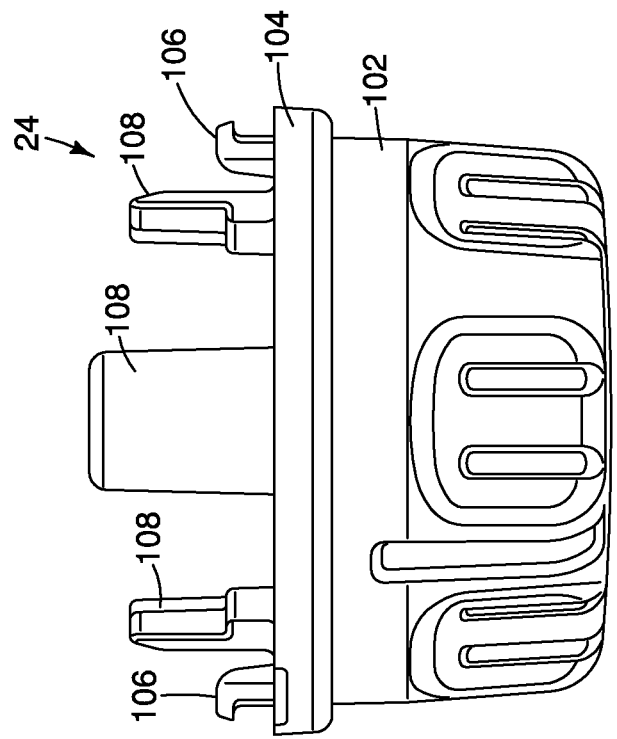
FIG. 12C is a side view of the bump knob shown in FIG. 12A.
Figure 12B:
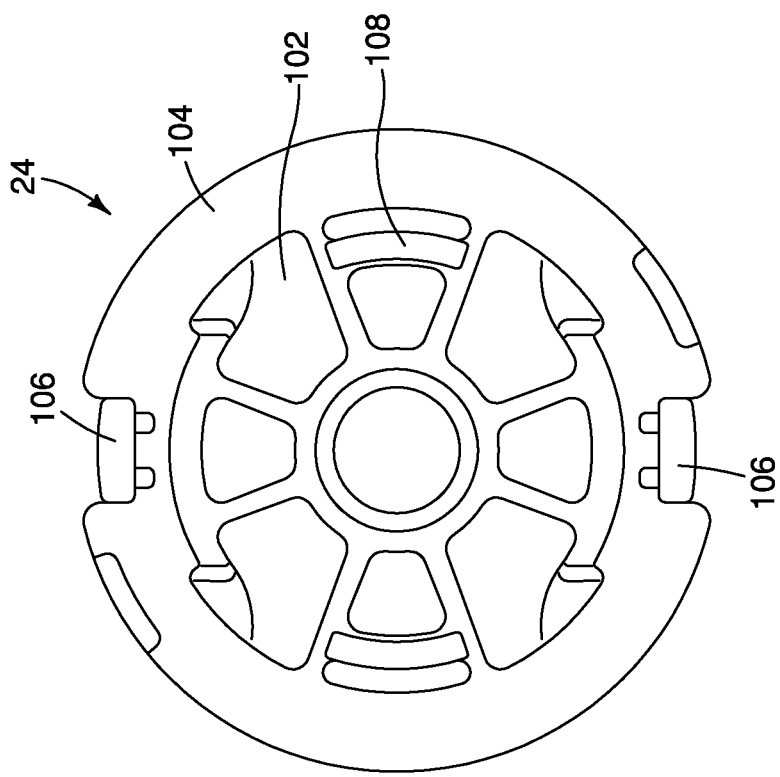
FIG. 12B is a top view of the bump knob shown in FIG. 12A.

In an embodiment, the bump knob 24 is releasably attachable to the spool 26. In another embodiment, the bump knob 24 and the spool 26 are integrally formed as a single member. The bump knob 24, as shown in FIGS. 12A-12C is formed as a cylindrical cup member. The bump knob 24 includes a body 102 and a circular rim 104 forming a ledge at the upper end of the sidewall of the body 102. The circular rim 104 is configured to abut the lower flange 86 of the spool 26 radially inward from the ramps 90. A pair of clips 106 extend upwardly from the circular rim 104. The pair of clips 106 are located on opposing sides of the circular rim 104. The clips 106 are configured to be received within corresponding slots formed in the spool 26 for releasably connecting the bump knob 24 to the spool 26.

In the embodiment of the bump knob 24 shown in FIGS. 12A-12C, a plurality of protrusions 108 extend upwardly from within the circular rim 104. The protrusions 108 are received within the core 80 of the spool 26 when the bump knob 24 is attached to the spool 26. The protrusions 108 are configured to stabilize the connection between the bump knob 24 and the spool 26.

FIGS. 6 and 13A-13C shown an embodiment of a trimmer line tube 30 that is positionable between the upper and lower disk bodies 32, 34 when the trimmer head 10 is assembled. The trimmer line tube 30 includes an elongated cylindrical tube 110 having opposing distal ends with one of the distal ends having a flared portion 114. A pair of stabilizers 112 extend laterally in opposing directions from the cylindrical tube 110. The stabilizers 112 are positioned adjacent to the distal end opposite the flared portion 114. The stabilizers 112 are configured to prevent the cylindrical tube 110 from rotating or otherwise becoming displaced when positioned between the upper and lower disk bodies 32, 34. The stabilizers 112 are shaped as D-shaped flat members, but it should be understood by one having ordinary skill in the art that the stabilizers 112 can be formed of any shape. The stabilizers 112 are integrally formed with the cylindrical tube 110, but the stabilizers 112 may also be formed separately from the cylindrical tube 110 and subsequently fixedly attached thereto. The length of the trimmer line tube 30 is sufficient to extend the length to extend from the inner surface of the housing 22 to the outer circumferential edge 62, 162 of the upper and lower rims 40, 140.

Typical bump feed-type trimmer heads often include grommets or eyelets that are insertable in the wall of the housing, wherein the trimmer line exits the housing through the grommet or eyelet. These grommets or eyelets aide in reducing the wear on the trimmer line during rotational operation of the trimmer head. Instead of providing such a wear-resistant member only at the opening to the housing, the trimmer line tubes 30 extend the entire length between the sidewalls of the upper and lower disk bodies 32, 34 to the outer peripheral edges 62, 162 of the lower and upper rims 40a, 40b. The trimmer line tubes 30 thus provide a radial pathway that extends between the hub 16 (or lower and upper cores 38a, 38b) and the outer circumferential edge of the rim 18 (or the lower and upper rims 40a, 40). The pathway provided by each of the trimmer line tubes 30 acts as a buffer between the trimmer line 14 and the housing 22 to prevent contact between any sharp edges or corners within the housing 22 or as the trimmer line exits the housing 22.

Figure 14A:
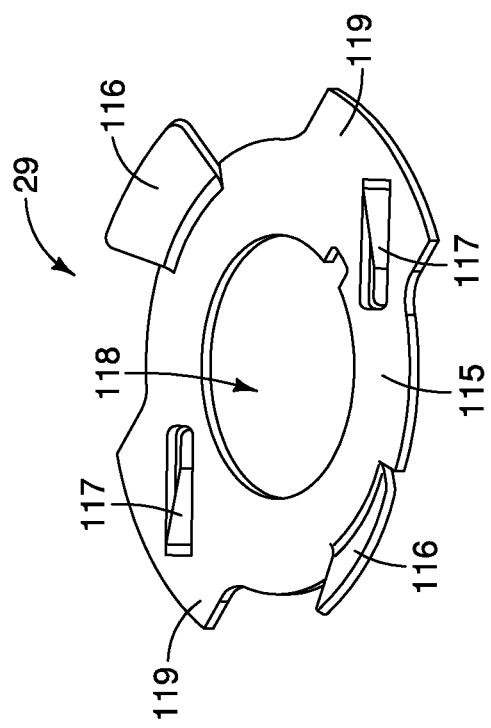
FIG. 14A is an isometric view of an embodiment of a cover plate.
Figure 14B:
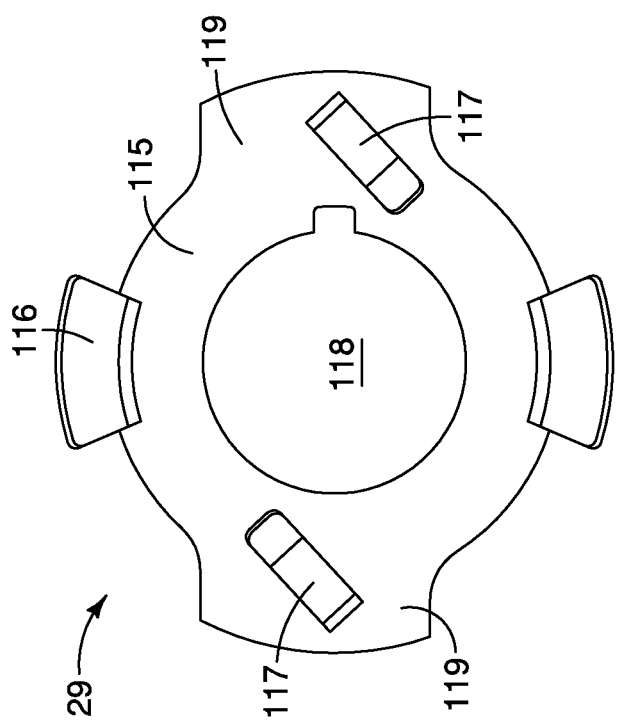
FIG. 14B is a top view of the cover plate shown in FIG. 14A.
Figure 14C:
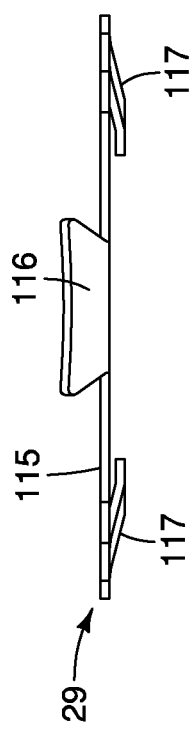
FIG. 14C is a side view of the cover plate shown in FIG. 14A.

FIGS. 11F-11G and 14A-14C illustrate an exemplary embodiment of a spool cover 29. The spool cover 29 is positioned between the spring 28 and the spool 26 in a "sandwiched" manner when the trimmer head 10 is assembled. The spool cover 29 is positioned immediately adjacent to the upwardly-directed surface of the portion of the central flange 82 located within the core 80. In an embodiment, as shown in FIGS. 14A-14C, the spool cover 29 is a substantially flat plate. The spool cover 29 includes a plate 115 having at least one cantilevered spring 117 extending downwardly at an angle relative to the plate 115, wherein each of the springs 117 is extendable into one of the grooves 98 formed into the portion of the central flange 82 of the spool 26 located within the core 80. The cantilevered springs 117 is configured to pinch, or otherwise removably secure a piece of trimmer line 14 between the spring 117 and the groove 98 within the trimmer line channel 96. The biasing force from the springs 117 is sufficient to allow the trimmer line 14 to be threaded through the core 80 but also prevents easy withdrawal of the trimmer line 14 from the trimmer line channel 96 without a pulling force significant enough to overcome the biasing force from the springs 117. The springs 117 allows the trimmer lines 14 to be easily secured within the trimmer line channels 96 during the initial insertion of the trimmer lines 14 as well as during the first few rotations of the spool 26 during the winding and loading of the trimmer line 14 into either the upper or lower channels 88 of the spool 26.

The spool cover 29 further includes a central aperture 118, as shown in FIGS. 14A-14C, for receiving the receiving member 46 of the upper disk body 32. The tabs 116 of the spool cover 29 assist in positively positioning the spool cover 29 within the core 80 of the spool 26 by engaging the core 80 as the spool cover 29 is disposed within the core 80. The spool cover 29 further includes pair of opposing lobes 119 extending from the plate 115, wherein the lobes 119 are received within protrusions extending radially inward from the core 80 of the spool 26 in order to ensure proper orientation of the spool cover 29 within the core 80.

Figure 15B:
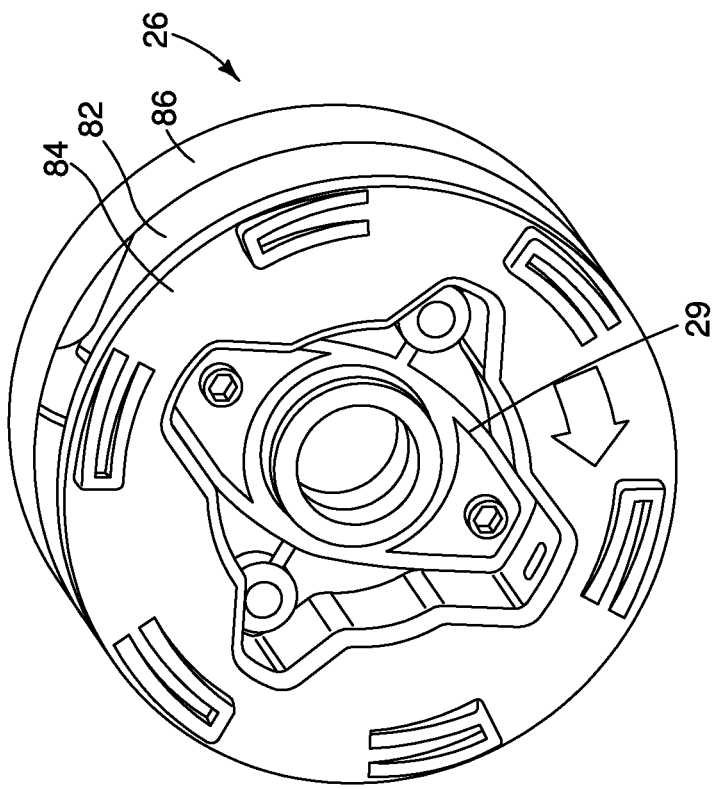
FIG. 15B is a top view of the spool shown in FIG. 15A with a cover plate.
Figure 15A:
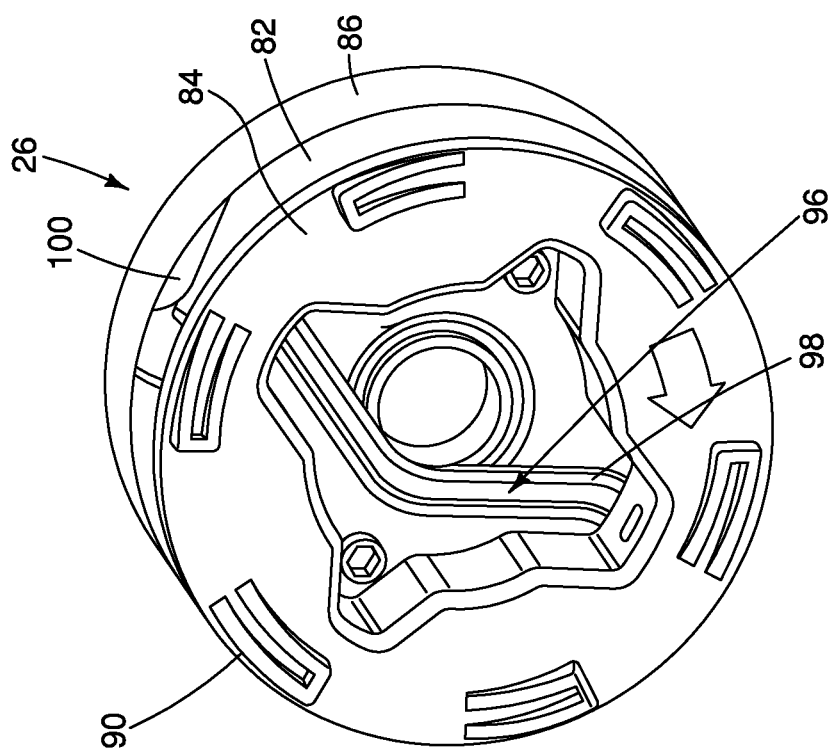
FIG. 15A is a top view of another embodiment of a spool.

FIGS. 15A-15B illustrate another embodiment of a spool 26, wherein the spool 26 includes a central flange 82, an upper flange 84, and a lower flange 86 extending radially outward from a core 80. The central flange 82 further includes a portion thereof extending within the core 80. A single trimmer line channel 96 is formed into the central flange 82, wherein the trimmer line channel 96 includes a groove 98 formed into the portion of the central flange 82 located within the core 80. A pair of pathways 97 extend radially outward in opposite directions from the core 80 and are formed into the central flange 82, wherein both pathways 97 connect to the groove 98 at the core 80. A cover plate 29 is disposed within the core 80 in an abutting relationship with the central flange 82 in order to cover the groove 98, thereby providing a tubular passageway through the core 80 of the spool 26. The spool 26 shown in FIGS. 15A-15B is configured to receive only a single piece of trimmer line 14 while providing a portion of the trimmer line 14 extending from both opposing sides of the housing 22.

The trimmer head 10 is assembled by attaching the bump knob 24 to the spool 26. The bump knob 24 and spool 26 are then inserted through the bump aperture 70 located in the lower core 38a of the lower disk body 34 until the rim 104 of the bump knob 24 abuts the inner surface of the lower core 38a. In this position, a portion of the bump knob 24 is located within the lower disk body 34 and a portion of the bump knob 24 extends downwardly through the bump aperture 70. The spool 26 is oriented such that the lower flange 86 is positioned adjacent to the lower disk body 34 and the upper flange 84 is positioned adjacent to the upper disk body 32. As such, the surface of the portion of the central flange 82 located within the core 80 is similarly directed toward the upper disk body 32. A cover plate 29 is positioned within the core 80 in an abutting relationship with the central flange 82, wherein the cover plate 29 encloses the open grooves 98 formed into the central flange 82.

The spring 28 is then placed within the core 80 of the spool 26 such that the spring 28 abuts the cover plate 29. The pair of trimmer line tubes 30 are placed within the depressions 60 formed into the lower arms 42a of the lower disk body 32, wherein the flared portion 114 of the trimmer line tubes 30 are positioned adjacent to the outer circumferential edge 62 of the lower disk body 32 and the opposing end of the trimmer line tubes 30 are positioned within the notches 74 of the sidewall of the lower core 38a.

The adapter 50 is inserted into the receiving member 46 of the upper disk body 32, wherein the nut 50b is fit into the corresponding recess 48. The spool 26 is slid over the receiving member 46 of the upper disk body 32 with the spring 28 positioned between the spool 26 and the upper disk body 32. The washer 52 is placed within the core 80 adjacent to the central flange 82 of the spool 26, wherein the bolt 54 is attached to the lower end of the adapter 50 to operatively connect upper disk body 32, spring 28, and spool 26 to the lower end of the handheld lawn maintenance tool 12. The lower disk body 34 is attached to the upper disk body 32 by inserting the connecting tabs 66 into the connecting apertures 56 while simultaneously joining the attachment mechanisms 64 of the upper disk body 32 and the attachment mechanisms 164 of the lower disk body 34. It should be understood by one skilled in the art that the explanation of assembly provided above does not represent the only step-by-step process of assembling the trimmer head 10 but instead represents one exemplary process.

Once the trimmer head 10 has been assembled, at least one cutting member 19a, 19b, 19c (FIG. 16) is loaded into or attached to the trimmer head 10. In one exemplary process for loading a monofilament trimmer line 19a into the trimmer head 10, an operator grasps the bump knob 24 and rotates the bump knob until the openings 100 to the trimmer line channels 96 of the spool 26 are aligned with the ends of the tube 110 of the trimmer line tube 30. The end of one piece of trimmer line 19a is then inserted into the trimmer head 10 through the flared portion 114 of a trimmer line tube 30. The operator continues to feed the trimmer line 19a into the trimmer head 10 as the end of the trimmer line 19a travels along the length of the trimmer line tube 30. As the trimmer line 19a exits the trimmer line tube 30, the end of the trimmer line 19a enters the opening 100 of the pathway 97 of the central flange 82 of the spool 26. The end of the trimmer line 19a is fed through the pathway 97 toward the core 80 of the spool 26, wherein the end of the trimmer line 19a passes through the core 80 and into the groove 98 enclosed by the cover plate 29. The operator continues to feed the trimmer line 19a until the end of the piece of trimmer line 19a exits through an exit aperture 99 formed in the core 80 and into either the upper or lower channel 88. As the piece of trimmer line 19a extends through the groove 98, the spring of the cover plate 29 extends into the groove 98 and engages the trimmer line 19a. A second piece of trimmer line 19a is then fed into the trimmer head 10 through the opposed trimmer line tube 30 and the trimmer line channel 96 until it is positively secured within the trimmer head 10.

After feeding the end of both pieces of trimmer line 19a into the trimmer head 10, the operator grasps the bump knob 24 and rotates the bump knob 24 to wind the pieces of trimmer line 19a onto the spool 26 such that each piece of trimmer line 19a is wound about the core 80 such that each piece of trimmer line 19a is wound into a separate channel 88. The bump knob 24 is rotated until only a portion of each piece of trimmer line 19a extends from the trimmer head 10.

In operation of the handheld lawn maintenance tool 12, the operator activates the handheld lawn maintenance tool 12 such that the motor rotates the adapter 50. Rotation of the adapter 50 is transferred to the trimmer head 10 through the engagement between the nut 50b of the adapter 50 and the recess 48 formed into the upper disk body 32. The rotation of the adapter 50 drives rotation of the upper disk body 32. The direct connection between the upper disk body 32 and the lower disk body 34 transfers rotation of the upper disk body 32 to the lower disk body 34. The spring 28 biases the spool 26 toward the lower disk body 34 such that the ramps 90 extending downwardly from the lower flange 86 of the spool 26 engage the ribs 158 of the lower disk body 34. As long as the ramps 90 engage the ribs 158, the spool 26 is prevented from rotating relative to the housing 22 and rotation is transferred from the lower disk body 34 to the spool.

In a bump operation, the operator causes the bump knob 24 to contact the ground, the sidewalk, or other hard surface. Upon such contact, the bump knob 24 is pushed axially into the housing 22, thereby similarly pushing the spool 26 toward the upper disk body 32. The spool 26 translates axially about the receiving member 46 of the upper disk body 32, which causes the stop surfaces 94 of the ramps 90 on the spool 26 to disengage from the ribs 158 of the lower disk body 34. Once the spool 26 disengages from the lower disk body 34, the spool 26 rotates slower than the housing 22 because the spool 26 is no longer driven. As a result of housing 22 rotating faster than the spool 26, the housing 22 rotates about the spool 26 a short distance such that a portion of each trimmer line 19a is unwound from both channels 88 and is fed through the trimmer line tubes 30 and out through the flared portion 114 thereof. As long as the bump knob 24 remains engaged with a solid surface, the spool 26 continues to rotate relative to the housing 22 until the stop surface 94 of the ramps 90 on the upper flange 84 of the spool 26 contact the ribs 58 of the upper disk body 32. Once the ramps 90 engage the ribs 58 on the upper disk body 32, the rotation of the upper disk body 32 drives or otherwise causes the spool 26 to rotate. When the trimmer head 10 is disengaged or pulled away from the solid surface, the spring 28 biases the spool 26 back toward the original position of the spool 26. The original position of the spool 26 is when the ramps 90 on the lower flange 86 of the spool 26 contact the ribs 158 of the lower disk body 34 and the lower disk body 34 begins rotationally driving the spool 26 again.

When installed, a portion of a monofilament trimmer line 19a or a portion of a shaped trimmer line 19b is positioned within each of the spokes 20 while another portion of the trimmer line 19a, 19b extends radially outward beyond the outer circumferential edge of the circular rim 18. In an embodiment, the length of the portion of the trimmer line 19a, 19b that is located within the trimmer line tube 30 or the pathway that extends through the spoke 20 and rim 18 relative to the portion of trimmer line 19a, 19b that extends outward from the circular rim 18 is at least four-thirds (4/3). As such, the ratio of the length of exposed trimmer line 19a, 19b to the length of trimmer line 19a, 19b located within the housing 22 is at least 4:3 (or 1.33). In another embodiment, the ratio of the length of exposed trimmer line 19a, 19b to the length of trimmer line 19a, 19b located within the housing 22 is at least 2:1. The length of exposed trimmer line 19a, 19b is smaller relative to the length of trimmer line 19a, 19b located within the housing 22. It should be understood by one having ordinary skill in the art that the ratio of the length of exposed trimmer line 19a, 19b to the length of trimmer line 19a, 19b located within the housing 22 can be any ratio greater than 1:1. The smaller the length of exposed trimmer line 19a, 19b results in reduced noise generated by the rotation of the trimmer line 19a, 19b during operation of the trimmer head 10. The smaller the length of exposed trimmer line 19a, 19b also reduces the amount of energy required to rotate the trimmer head 10. It should be understood by one having ordinary skill in the art that the length of exposed trimmer line 19a, 19b that extends from the trimmer head 10 should be minimized in order to reduce the noise generated by rotation of the trimmer line 19a, 19b during operation.

In prior art trimmer heads, the trimmer head was rotated at a significantly high rotational speed because the end tip of the trimmer line that extends from the trimmer head was still relatively close to the central rotational axis of the trimmer head. As such, in order to achieve a tip speed of the trimmer line that would sufficiently cut the vegetation—as opposed to simply push down the vegetation or otherwise generate a rough cut of the vegetation—the rotational speed of the trimmer head had to high. It also takes a significant amount of energy to rotate the prior art trimmer heads at a speed sufficient to generate a high-quality cut of the vegetation. The high-efficiency trimmer head 10 shown in FIGS. 2-5 solves this problem by positioning the tip of the trimmer line 19a, 19b at a significantly greater distance away from the central rotational axis of the trimmer head 10. As a result, the rotational speed of the trimmer head 10 is reduced, and such a reduced rotational speed of the trimmer head results in substantially the same rotational velocity at the end tip of the trimmer line 19a, 19b. Further, the reduced rotational speed of the trimmer head 10 also results in less energy required to rotate the trimmer head 10. Additionally, this slower rotational speed of the trimmer head 10 also results in less noise generated by the rotation of the trimmer line 19a, 19b and the motor (not shown) that rotates the trimmer head 10.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A trimmer head comprising:
   a housing having a core, a circular rim, and at least two arms that extend radially between said core and said circular rim, said circular rim being spaced apart and oriented concentrically about said core;
   at least two openings formed through an outer circumferential edge of said housing, wherein each of said at least two openings are aligned with one of said at least two arms for allowing a piece of a trimmer line to extend radially outward from said housing through said opening; and
   a spool and a spring, wherein said spool is positioned within said housing and said spring is located between said spool and said housing for biasing said spool into selective engagement with said housing.

2. The trimmer head of claim 1 further comprising a bump knob extending downwardly from said housing, said bump knob being releasably attached to said spool, wherein contact of said bump knob with a solid surface causes said spool to disengage from said housing.

3. The trimmer head of claim 1, wherein each of the at least two arms of said housing comprises a pair of elongate channels extending radially outward to said circular rim.

4. The trimmer head of claim 3, wherein said housing includes an upper disk body and a lower disk body, and each of said pair of elongate channels is formed by the mating of one half of said channel formed in the upper disk body and a second half of said channel located in the lower disk body.

5. The trimmer head of claim 4, wherein a trimmer line tube is positioned within each of said elongate channels for receiving a portion of the trimmer line.

6. The trimmer head of claim 5, wherein said spool receives the trimmer line, wherein said trimmer line tube extends radially outward from a location adjacent to said spool toward said outer circumferential edge of said housing.

7. A trimmer head comprising:
   a housing having an upper disk body and a lower disk body, wherein each of said upper disk body and said lower disk body includes a core, a rim, and a plurality of arms extending between said core and said rim;
   a plurality of elongate channels formed by said upper and lower disk bodies, wherein each of said elongated channels extends through each of said arms to an outer circumferential edge of said housing; and a first portion of a trimmer line is positioned within each of said channels, and a second portion of said trimmer line extends outwardly from said outer circumferential edge of said housing.

8. The trimmer head of claim 7, wherein the second portion of each of said trimmer lines extending outwardly from said outer circumferential edge of said housing is less than the first portion of said trimmer line positioned within said channel.

9. The trimmer head of claim 7 further comprising an opening for each of said elongate channels being formed through said outer circumferential edge of said housing, wherein a portion of one of said trimmer lines extends through each of said openings.

10. The trimmer head of claim 7, wherein each of said trimmer lines is formed as a monofilament trimmer line or a shaped trimmer line.

11. The trimmer head of claim 7 further comprising a trimmer line tube positioned within each of said channels formed by said upper and lower disk bodies, wherein each of said trimmer line tubes receives one of said portions of the trimmer line.

12. The trimmer head of claim 7, wherein said arms of said lower disk body and said rim of said lower disk body are integrally formed together, and said core of said lower disk body is attached to said arms of said lower disk body.

13. The trimmer head of claim 7, wherein each of said elongate channels receives a trimmer line tube therein, said trimmer line tube configured to receive one of said portions of the trimmer line.

14. The trimmer head of claim 13, further comprising a spool, wherein said second portion of the trimmer line extending from each side of the outer circumferential edge of said housing is shorter than the length of said trimmer line extending between the spool and the outer circumferential edge of said housing.

15. A trimmer head comprising a central hub, a circular rim spaced apart from said central hub, and a plurality of spokes extending between said central hub and said rim, wherein at least one cutting member extends radially outward from said rim, wherein the at least one cutting member is configured as trimmer line, the trimmer head further comprising a spool for receiving at least one piece of the trimmer line, wherein the spool is positioned within said central hub.

16. The trimmer head of claim 15 further comprising a spring positioned between the spool and an upper portion of said hub or a lower portion of said hub, said spring biasing said spool into selective engagement with said lower of said hub or the upper portion of said hub.

17. The trimmer head of claim 15, wherein said trimmer line is a shaped trimmer line.

* * * * *